US005696914A

United States Patent [19]

Nahaboo et al.

[11] Patent Number: 5,696,914

[45] Date of Patent: Dec. 9, 1997

[54] USING AN EMBEDDED INTERPRETED LANGUAGE TO DEVELOP AN INTERACTIVE USER-INTERFACE DESCRIPTION TOOL

[75] Inventors: Colas Nahaboo, Les Pins; Vincent Bouthors, Mougins, both of France

[73] Assignee: Bull S.A., Pateaux, France

[21] Appl. No.: 211,133

[22] PCT Filed: Jul. 21, 1993

[86] PCT No.: PCT/FR93/00749

§ 371 Date: Mar. 22, 1994

§ 102(e) Date: Mar. 22, 1994

[87] PCT Pub. No.: WO94/02895

PCT Pub. Date: Feb. 3, 1994

[30] Foreign Application Priority Data

Jul. 22, 1992 [FR] France ................................ 92 09057

[51] Int. Cl.[6] ............................ G06T 11/60; G06F 13/00

[52] U.S. Cl. .......................... 395/333; 395/133; 395/346; 395/353; 395/682; 395/701

[58] Field of Search .................................... 395/700, 155, 395/701, 682, 133, 346, 353, 333; 364/280

[56] References Cited

U.S. PATENT DOCUMENTS

| | | | |
|---|---|---|---|
| 4,811,240 | 3/1989 | Ballou et al. | 364/518 |
| 4,912,629 | 3/1990 | Shuler, Jr. | 364/200 |
| 4,989,132 | 1/1991 | Mellender et al. | 364/DIG. 1 |
| 5,243,697 | 9/1993 | Hoeber et al. | 395/156 |

FOREIGN PATENT DOCUMENTS 0395606 10/1990 European Pat. Off. .

OTHER PUBLICATIONS

Barthes; "A Command & Control System Based on a Muulti-media Object Oriented Data Base & A Logic Programming Language", IEEE, 1988.

Danieli, et al., "Parallell Object Oriented Programming in Sympal" IEEE; 1988.

Lingard; "Naval Intelligence Knowledge-Based Decision Support For Naval Command", IEEE, 1990.

Sebesta; "Concepts of Programming Languages" Benjamin Cummings, 1992.

Ng et al., "A Visual Concurrent LISP Environment & Its Application"; 1992.

Teitleman; "A Display-Orvated Programmer's Assistant", (ROM *Interactive Programming Environments*); McGraw-Hill; 1984.

Teitleman, et al.; "The Interlisp Programming Environment"; (Rom *Interactive Programming Environments*); McGraw-Hill; 1984.

Wilensky; *Lispcraft*; W. W. Norton & Co., 1984.

Winston et al.; *Lisp;* Addison-Wesley; 1984.

The Visual Computer, "Environment for Rapidly Creating Interactive Design Tools", B.A. Myers, et al, vol. 8, No. 2, Feb. 1992, pp. 94–116.

"A User Interface Construction Environment with Editors as Software Parts", H. Tarumi, et al, NEC Research and Development, No. 98, Jul. 1990, Tokyo, Japan, pp. 89–97.

"X Widget Based Software Tools for Unix", Doug Blewett, et al, Proceedings of the Winter 1992 Usenix Conference, Jan. 20, 1992, Berkeley, California, pp. 111–123.

"Table-Driven Method for Option Processing", Research Disclosure, No. 319, Nov. 1990, Emsworth, GB, p. 863, (31916).

*Primary Examiner*—Kevin A. Kriess
*Assistant Examiner*—Michael T. Richey
*Attorney, Agent, or Firm*—Weingarten, Schurgin, Gagnebin & Hayes LLP

[57] ABSTRACT

This invention concerns an interactive interface description tool that uses an interpreted language in which both the data and the programs have a similar representation. This tool also has an interpreter that is embedded with the interface description program. This interpreter consists of a mixture of "C" language and interpreted language instructions and uses a library ("X/MOTIF") of interactive command objects ("widget") and a library of graphical objects ("GO").

19 Claims, 5 Drawing Sheets

USING AN EMBEDDED INTERPRETED LANGUAGE TO DEVELOP AN INTERACTIVE USER-INTERFACE DESCRIPTION TOOL

CROSS REFERENCE TO RELATED APPLICATION

Cross reference is made to Rule 371 application, PCT/FR93/00749, filed Jul. 21, 1993.

FIELD OF THE INVENTION

This invention is related to interactlve user-interface description tools using an embedded interpreted language.

BACKGROUND OF THE INVENTION

Interactive software has very specific constraints. The most important limitation is that they can be changed very often. In fact, for ergonomic reasons, it is difficult to develop programs that are user-friendly and ready for marketing in a single try. The first version is almost always a failure and needs numerous revisions and modifications.

Moreover, it may be desirable or necessary to change the way an operation is activated by adapting it to a different context or to a different user.

Finally, a good program that uses a bad interface can expect to have mitigated commercial success.

SUMMARY OF THE INVENTION

The purpose of this invention is to define an extremely flexible interface development tool that can be used regardless of the application. For example, this interface has been developed for UNIX systems using X/WINDOW and X/MOTIF which are registered trademarks of M.I.T. and the Open Software Foundation respectively.

This goal is attained because the interactive interface description tool uses a LISP-type interpreted language and because the. interpreter (WOOL) is embedded with the application's interface description program and with the application produced.

Another feature of this invention is that both the data and the programs have a similar representation.

Another feature of this invention is that the description program contains a library "X/MOTIF" of interactive command objects "Widgets" and a library of graphical objects "GO".

Another feature of this invention is that the application program consists of a mixture of instructions. Some of these instructions are written in the C language. C is a high-level portable assembler that manipulates objects. The other instructions are written in an interpreted language.

Another feature of this invention is that the interpreter is object-oriented in the LISP language.

Another feature of this invention is that the interpreter uses arrays.

Another feature of this invention is that the interpreter kernel is organized as a two-dimensional matrix. The first dimension contains the lists, the strings and the numbers. The second dimension contains the selector with functions such as "eval, print, free, add, . . . ".

Another feature of this invention is that the WOOL interpreter includes a garbage collector (GC) that periodically scans the memory for unused objects whose space can be reused. This is accomplished without interrupting use of the interpreter.

Another feature of this invention is that the garbage collector (GC) is incremental.

Another feature of this invention is that the garbage collector uses reference counters and a mechanism that sorts the objects by size in order to limit memory fragmentation.

Another feature of this invention is that the functions of the interactive tool are described using an interpreted program.

Another feature of this invention is that storage of the interface format is edited and executed in the same manner as a WOOL program.

Another feature of this invention is that the interactive assembly geometry specification of these objects is translated into a file that is used by an application and can be stored on disk. This file will contain the user-interface format in the form of a WOOL language program.

Another feature of this invention is that the dynamic behavior of the interactive objects ("widgets") is defined by a set of callback procedures written in the "WOOL" language. These procedures designate the application functions called by the "X/MOTIF" toolkit when an entry flag is received.

Another feature of this invention is that the interface description program can be expanded by adding other "widget" classes. These classes can be added by describing the new attribute types of each class in the WOOL language so that the new "widgets" can be edited.

Another feature of this invention is that each "widget" is indicated by a "WOOL" object of the "WOOL" class that corresponds to the "widget's" class. Supplementary attributes are attached directly to the "WOOL" object.

Another feature of this invention is that each WOOL object is an auto-typed structure written in the C language containing the object type and the reference counter information.

Another feature of this invention is that a unique "WOOL" identifier is assigned to each interactive object "widget" in an incremental fashion.

Another feature of this invention is that the interactive interface description tool "EGERIA" includes a program that allows a base menu to be displayed. This menu contains an editing function "edit", a creation function "create" and a geometry function "geometry".

Another feature of this invention is that the creation function "create" allows the user to create any "widget" from a menu. After selecting a menu line, the shape of the cursor changes and by clicking the mouse on an interactive object container "widget container", the object type that is selected in this interactive object container will be installed.

Another feature of this invention is that the editing function "edit" allows the user to edit the attributes of a "widget" in a separate window. The user can cut, paste, copy or duplicate the set of selected "widgets" as well as edit the attributes of parent "widgets" of a selected "widget" or make the parent of a currently selected "widget" the new selected "widget".

Another feature of this invention is that the geometry function "geometry" allows the user to control the geometry of a set of selected "widgets". These "widgets" can be aligned to the top, to the bottom, to the right side, to the left side or have identical heights or widths.

Another feature of this invention is that the editing function allows the user to display a "widget" attribute editing window that is divided into two sections. One section includes the functions that are called from the application of callback procedures and the other contains the attributes created by a set of sub-editors.

Another feature of this invention is that the first sub-editor consists of a toggle button used to enter boolean attributes.

Another feature of this invention is that the second sub-editor consists of a push button that displays a menu containing lists of enumerated-type values (ex. alignment of a text to the left, to the right or in the center).

Another feature of this invention is that the third sub-editor consists of a text area where text or numerical values are entered.

Another feature of this invention is that the editing function of MOTIF-type interactive objects "Shell widgets" represents a first-level window (X/Windows) and is activated by selecting the "select parent" menu and then the "edit attribute" function.

DESCRIPTION OF THE DRAWINGS

Other characteristics and advantages of this invention will become evident in the following explanations and descriptions. These descriptions are aided by the enclosed drawings in which.

DETAILED DESCRIPTION OF THE INVENTION

Figure 1A:
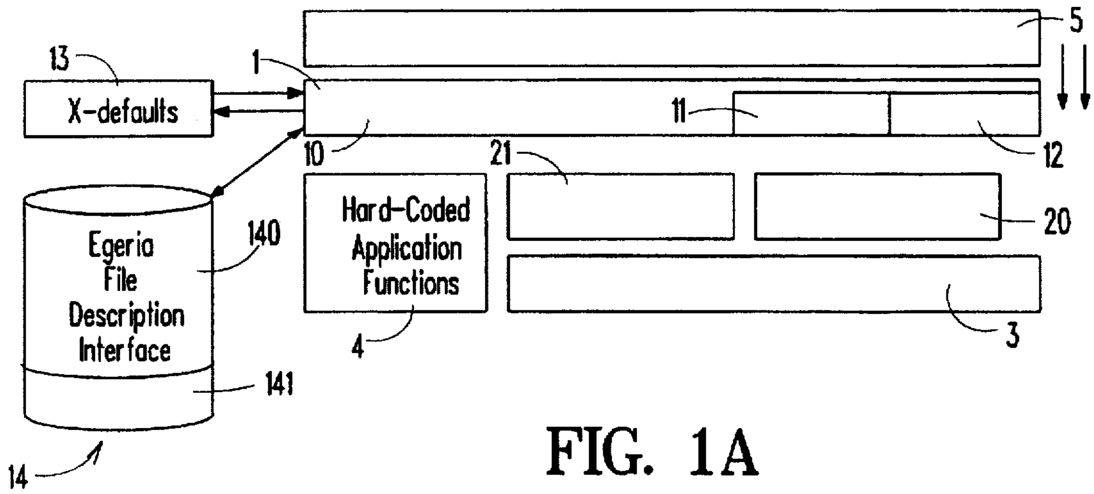
FIG. 1A is a schematic representation of the architecture of the interface description software.

The interactive interface description tool "EGERIA" illustrated in FIG. 1 contains:

- an editor that allows the user to create or modify an interface (10),
- an interpreter library "WOOL.LIB" (11) that uses link editing with the application to produce the complete application,
- an editor library "Edit. LIB" (12) that uses link editing with the application code to produce an editor that enables real-time execution of the application functions. These two libraries "WOOL.LIB" and "Edit. LIB" are both provided in the "libEg.a" library.

In order to function, this interactive description interface (10) must be associated with a library of interactive command objects (called command object toolbox "X/MOTIF" (20) in the UNIX environment) and a graphical object toolbox that includes a library of graphical objects "GO" (21). This powerful library is written in the C++ language and provides graphic functions that are not available in the UNIX environment at this time. This library also allows the user to create and control rectangles, ellipses, polygonal lines, images and text that can be edited in several fonts.

The description tool also includes a library "Xlib" (3) consisting of a protocol layer specifying the information flow coding that cycles between the application, the windowing server and the library layer containing the program interface. This allows the user to access the windowing system.

EGERIA (10) covers the format layer that describes a set of objects in an interface in a static manner. In other words, it describes their hierarchy, their attribute and the dialogue layer. This layer describes the dynamic aspect of the interface's behavior.

Finally, a supplementary layer (5) is formed by the application. This layer includes the semantic layer container and does not include the interface in the application.

The "WOOL.LIB" (11) interpreter is a small LISP interpreter written in the C language. In this interface, memory is controlled by a reference counter. This counter uses internal-typing that sends messages conforming to an object-oriented approach in order to verify the type and activate the procedure.

The interpreter provides a set of database types such as atom, list, whole number, real number and character string.

The "WOOL.LIB" (11) interpreter uses arrays to store lists in order to accelerate list scanning.

This set of base types is expandable because a new base type such as a "widget" can be introduced. The new base type will allow the user to manipulate "MOTIF" objects in "WOOL".

Figure 1B:
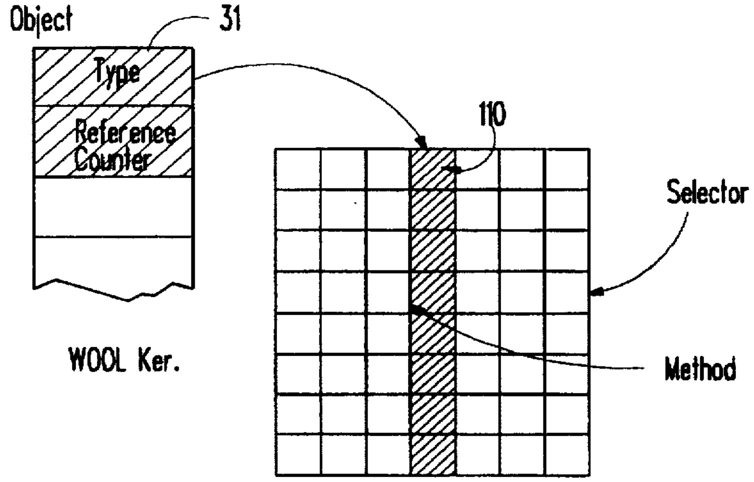
FIG. 1B is a schematic representation of a kernel structure of the interface description software of FIG. 1A.

As illustrated in FIG. 1B, each "WOOL" object consists of a header. This header points to the reference counter (Ref Cnt), to the class corresponding to the object's type (31) as well as to other information (attributes) depending on the type of object. Each "widget" object is assigned an identifier in an incremental manner.

Each widget that is created by EGERIA is assigned a unique identifier such as "@000012@".

The uniqueness of this identifier is guaranteed throughout the EGERIA session. If these references are used in "WOOL", for callback text that is attached to the widgets, a save (or a cut) followed by a restore (or a paste) will preserve the mutual coherence of the references. However, if the mutual references are produced in "WOOL" using atoms, an atom will have only one value and the two callbacks will refer to the same widget.

The use of unique widget identifiers in the dialogue code allows the user to construct windows whose behaviors can easily be duplicated. For example, the behaviors can be duplicated using an interactively edited window with a button and text. The callback assigned to the button is the following:

(on XmNactivateCallback (widget) (widget-unmap @00002@))

When the button is pressed during execution mode, the text disappears. The purpose of the "unmap" command is to make the widget specified by its argument invisible.

If the window is duplicated during a cut/paste operation, the behavior will also be duplicated and EGERIA changes the callback code assigned to the duplicated button as follows:

(on XmNactivateCallback (widget) (widget-unmap @00005@))

where @00005@ is the unique identifier generated by the duplicated text.

This procedure allows the user to avoid having to manually change the callback code during an application.

The object type allows the user to access a class (110) containing a list of methods in the "WOOL" interpreter kernel (WOOL KERNEL). Each method is a function such as "Print". Thus, the "Print" function of an object will be adapted to the type of object processed. Classes consist of the matrix array columns shown in FIG. 1B and the array's line methods. The list of methods is embedded in the WOOL.LIB interpreter. In other words, it is released using the editor (refer to Appendix 6).

In the "WOOL.LIB" (11) interpreter, an atom can only have one value, while in traditional LISP languages, a variable and a function can be given the same name without conflict.

This interpreter uses a set of "Lisp" primitives that are easily expandable.

Finally, the "WOOL.LIB" interpreter is written in an object-orientated manner and the objects are classified or typed internally by the interpreter.

Another characteristic of the interpreter is that it is re-enterable. This means that a function that is activated by it can reactivate an interpretation that will have access to the same WOOL data stack.

A garbage collector, formed using the old reference counting method, required additional precaution when the auto-referencing structures were created. The "WOOL.LIB" interpreter includes a garbage collector (GC) that periodically and in a cyclic manner, scans the memory for unused objects whose space can be reused. This is accomplished without interrupting use of the interpreter. This garbage collector (GC) is incremental. The garbage collector uses reference counters which allow any size object to be allocated and a mechanism that sorts the objects by size in order to limit memory fragmentation.

The "WOOL.LIB" interpreter activates a garbage collector (GC) that allows unused memory to be automatically recuperated. Because of this, the programmer does not need to worry about assigning or unassigning objects that are used. This type of system makes more rapid programming possible because the programs do not have to contain code that can be laborious to create or to verify and which usually concerns memory management.

The "WOOL.LIB" garbage collector is incremental in that it operates continuously and on low data volumes. However, traditional garbage collectors are only called occasionally in order to recuperate a large volume of memory. In this case, the period during which the garbage collector (GC) is active translates into a perceptible pause in the program currently being interpreted. This can be very inconvenient for the user of an interactive program. An incremental garbage collector (GC) guarantees that interpretation takes places smoothly. The increase in speed is due to the fact that the garbage collector (GC) is uniformly divided by the execution set of the interpreted program.

The incrementation characteristic of the "WOOL.LIB" garbage collector (GC) is obtained by:

- maintaining a reference counter for each object assigned. This object will not be released until this counter reaches zero.
- considering that the majority of the assigned objects are, in fact, unassigned very rapidly after their creation. After all of the instructions contained in a sequence of expressions have been executed, a special area is scanned to find such objects at regular intervals.

The names that EGERIA gives to the "X/MOTIF" widgets are compatible with the conventions imposed by X/Windows and X/Motif. This allows the interface to be divided into parameters (default file X, option to run programs).

The coding in EGERIA contains references necessary for link editing.

When using EGERIA with the "X/MOTIF" (20) toolkit, the following items are usually included in the EGERIA (10) code:

- the description of the base types ("widget", callback procedure, etc. . . . , for example XmTopLevelShell, (see (40) in Appendix 4)),
- the interface object classes (push button, scrollbar, menubar, etc. . . . ) and the primitives (toolkit-init, create "widget", etc. . . . , for example:, on XmNinputCallback of the "widget" XmDrawingArea, (see (432) in Appendix 4)),
- the different kinds of base types (enumerated, dimension, etc. . . . , for example: XmNwidth of XmTopLevelShell),
- the attributes that are unique to each class.

High level functions that are written using primitives will be placed in the external file (14). This allows the user to add new interface object classes.

The EGERIA (10) structure is characterized by a main entry scanning loop that distributes the events (mouse click, keyboard entry) received by different program components. One example of such a loop (refer to 511 in Appendix 5) is used in the application example given in the continuation of Appendices 4 and 5.

The "WOOL.LIB" interpreter does not contain the main application loop. The application (5) maintains control of this loop.

This loop is designed to call the scanning function Motif and then distribute the entry received. This means that a level of programming exists in which the user can choose the entity responsible for processing each X/Windows event and therefore for each "Motif" event. "Motif" may call the callback procedure defined by the "widget" assigned to the event or by another component such as EGERIA.

When described by EGERIA, a callback such as "call-back dog:draw" written in LISP (see 435 in Appendix 4) or "call-back dog:step" (see 4412 in Appendix 4) is created by calling the main entry point (530 and 531 respectively, Appendix 5) of the "WOOL.LIB" interpreter that is going to execute the associated method (523 and 525 respectively, Appendix 5). This interpreter is written in the C language and processes as fast as possible.

Finally, using a hybrid system that operates in the LISP and C languages, causes certain conversion problems when converting C function parameters to LISP and from LISP to C. The solution is to use natural C structures for the LISP system whenever possible. But, these structures must be prefixed with a header in the "WOOL" language (for example 522, Appendix 5).

FIG. 1B represents the kernel structure (WOOL KERNEL) that is organized according to an array in which each column corresponds to one object type. An object is referenced by its type and this allows the user to access the message processing method that can process the object.

In the execution mode, the "WOOL.LIB" (11) interpreter is responsible for loading the interface description file (13) that includes annex 4, when this interface has been created. "WOOL.LIB" executes this interface description file (14) as a WOOL language program in order to reconstruct the application interface and then interpret all the events that arise from the MOTIF toolkit. Then, the system will react in a purely dynamic manner in the interface without restarting the application or it will send the event to the application using an entry point of the application as an intermediary.

The EGERIA editor (10) has essentially two operating modes: editing and execution.

In the editing mode, the application interface can easily be modified and the execution mode allows the user to test the behavior of the interface.

Finally, if the editor that is used causes link editing of the editor library (12) with the application (5), then the application functions are called.

In order to edit objects, the program uses the traditional functions: create, cut, copy, paste, edit, attributes such as undo, as well as other important new features such as the FORM EDITOR, the Attribute Editor and the object hierarchy. The "widget" objects can be organized into two categories, elementary objects and "container widgets" that can contain several objects. Some containers, such as interactive shell objects ("shell widgets"), have a container and are created at the first level (for example, "Top Level Shell" as listed in Appendix 4).

A MOTIF FORM widget is a "container" widget whose children are automatically positioned or resized when the FORM widget is resized. The interactive specification of the behavior of a child of such a widget is fulfilled using a special formula or "FORM EDITOR" that allows the user to easily define the set of behaviors provided by MOTIF.

Figure 3:
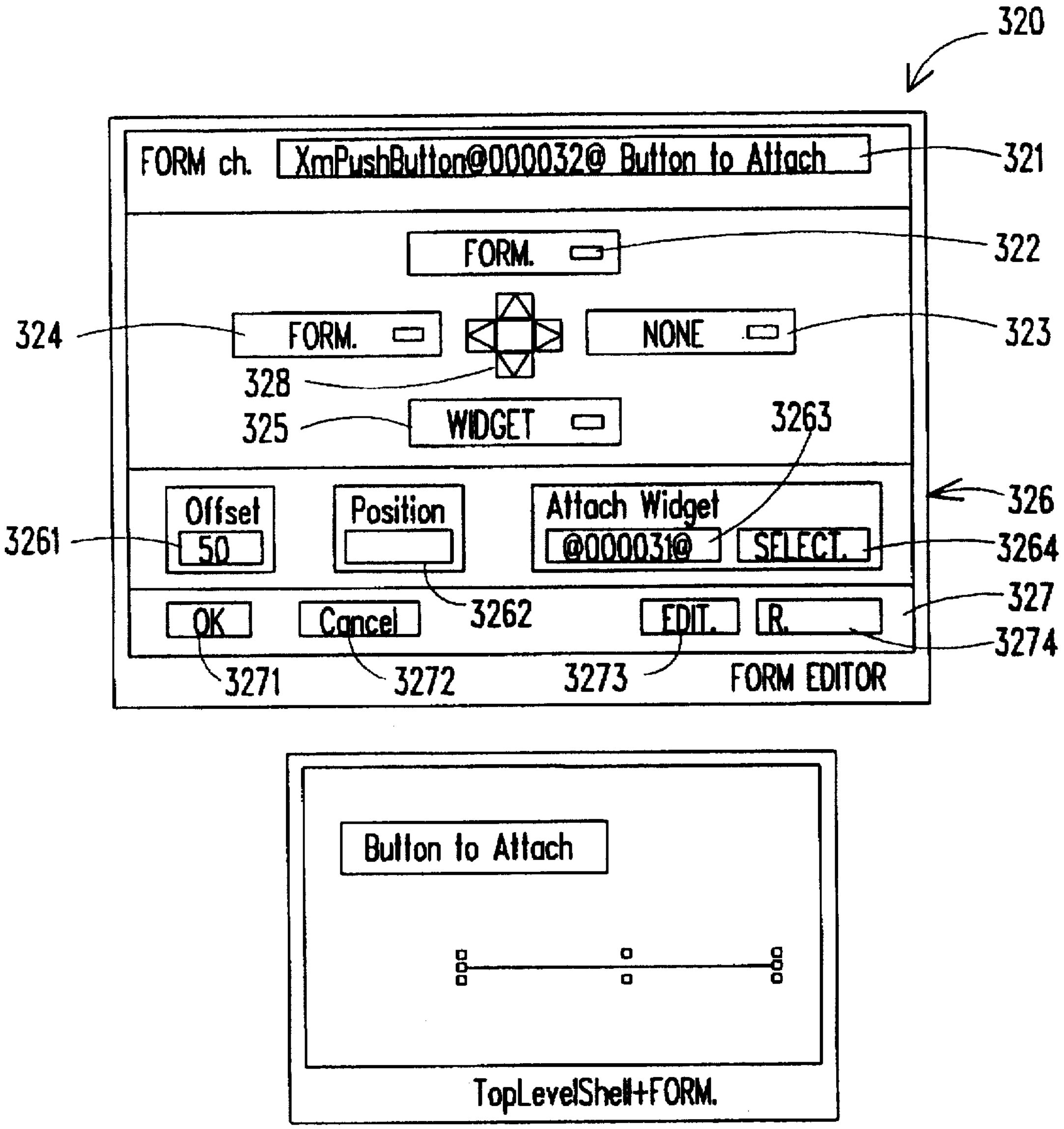
FIG. 3 represents a window that is displayed by the software of FIG. 1A that allows the shape of an object to be edited.

In FIG. 3, the behavior of a child of the FORM widget, for example, XmPushButton (321), is specified by giving the attachment value for the edges of the widget. These are designated as top (322), right (323), left (324) and bottom (325) respectively.

An attachment can be NONE (no attachment (323)), FORM (attachment with respect to the edge corresponding to the FORM (322, 324)), POSITION (attachment proportional to the horizontal or vertical dimension of the FORM widget (3262)) or WIDGET (attachment corresponding to a child widget of the same FORM (325)).

It is possible to specify a supplementary offset distance (3261) with each attachment. This distance will correspond to the position specified in the editing area (3262).

FIG. 3 illustrates the "FORM EDITOR" in which four menus can be displayed in order to specify the attachment type of a given child widget. For each attachment, an interactive arrow (328) indicates which attachment is "current". The selection of any attachment will update the positioned attachment.

Figure 2:
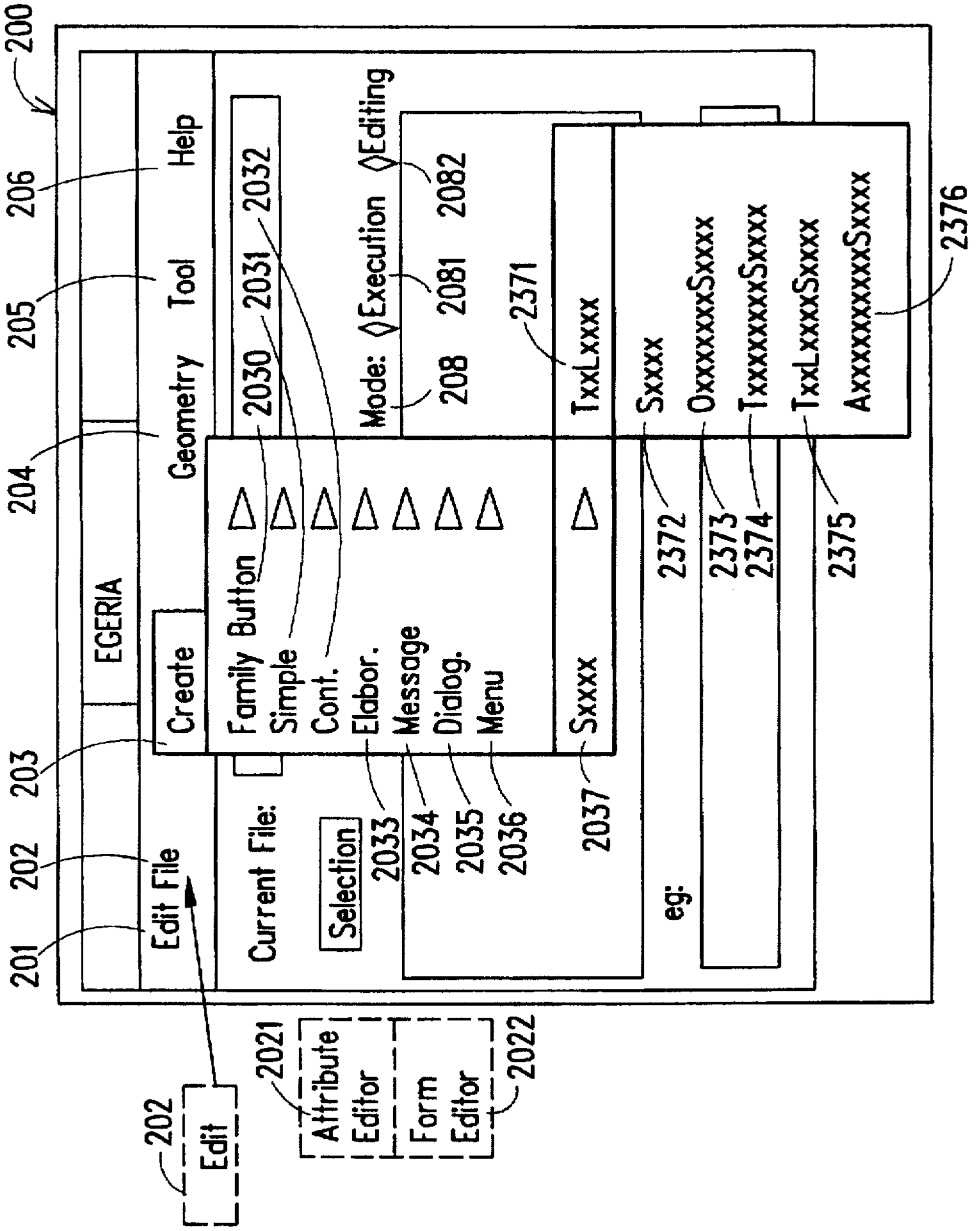
FIG. 2 represents the main window that is displayed by the software of FIG. 1A in order to describe an interface.

In order to edit a FORM child using this editor, the user selects the widget and uses the "FORM EDITOR" command (2022) which is activated from the "Edit" menu (202) as illustrated in FIG. 2. The widget's class, name and identifier appear in a text area (321) of the FORM EDITOR. This window will then display the characteristics of the widget that concern its behavior as a child of the FORM widget.

Two text areas describe the widget's offset (3261) and position (3262) (when the attachment is POSITION) corresponding to the current attachment. When the current attachment changes, these text areas are updated. When the attachment is not POSITION, the text areas labelled "position" are inactive and its title is shaded, as shown in FIG. 3.

It is possible to interactively move or resize the child widget with the mouse. In this event, the command is executed as if it had been sent from the FORM EDITOR and the text areas corresponding to the offset and/or to the position are updated.

The editor also allows the user to create elaborate objects ("widget" container) that are made up of several objects, but which are still considered to be simple objects. In other words, they can be cut and pasted in a single operation.

As illustrated in FIG. 2, all objects are created using the creation function "create" (203) in the main menu (200). This function allows the user to place an object inside an object container after selecting the object with a mouse click. This main menu (200) also includes the traditional functions "File" (201), "Help" (206) and the specific functions "EDIT", "CREATE", "GEOMETRY" and "TOOLS".

The appearance of the interface can be edited by using the mouse to change the size or the position of the "widgets" inside their container or by using formulas containing the different attributes of one or more objects. In other words, the "Edit" function (202) is used. This function allows the user to edit the attributes of parent objects of a selected object or to cut, paste, merge or copy a set of selected objects. Finally, this function allows the user to modify the geometry of the display by using the "geometry" function (204). This function allows the user to align a set of selected objects to the top, to the side or the base, or to vary the width or height of the set of objects.

As illustrated in FIG. 2, the "CREATE" menu (203) allows the user to choose between the different objects that are available in the X/MOTIF library. These objects are formed by a number of buttons (2030), a container (2032), an elaborate object (2033), a simple object (2031), a message type object (2034), a dialogue-type object (2035), a menu-type object (2036) and a container-type object ("Shell") (2037). When the Shell option is selected, a second menu appears in which the user can select the following attributes: maximum level (2371), shell (2372), override shell (2373), transient shell (2374), Top Level Shell (2375) or Application Shell (2376).

The attribute part is executed with a set of sub-editors. These sub-editors are automatically created by reading a description of the classes from the "X/MOTIF" library (11). There are three types of sub-editors: A sub-editor with a toggle button used to enter boolean attributes; a push button sub-editor that displays a menu for enumerated data; and a text area sub-editor for text and numerical values (such as those listed in Appendix 4, reference (436)).

By selecting the "Edit" function from the menu bar and then selecting the "Attribute Editor". (2021), the user can edit the attributes of a widget. This selection prompts the display of a cell-type window as illustrated in FIG. 4A.

Figure 4A:
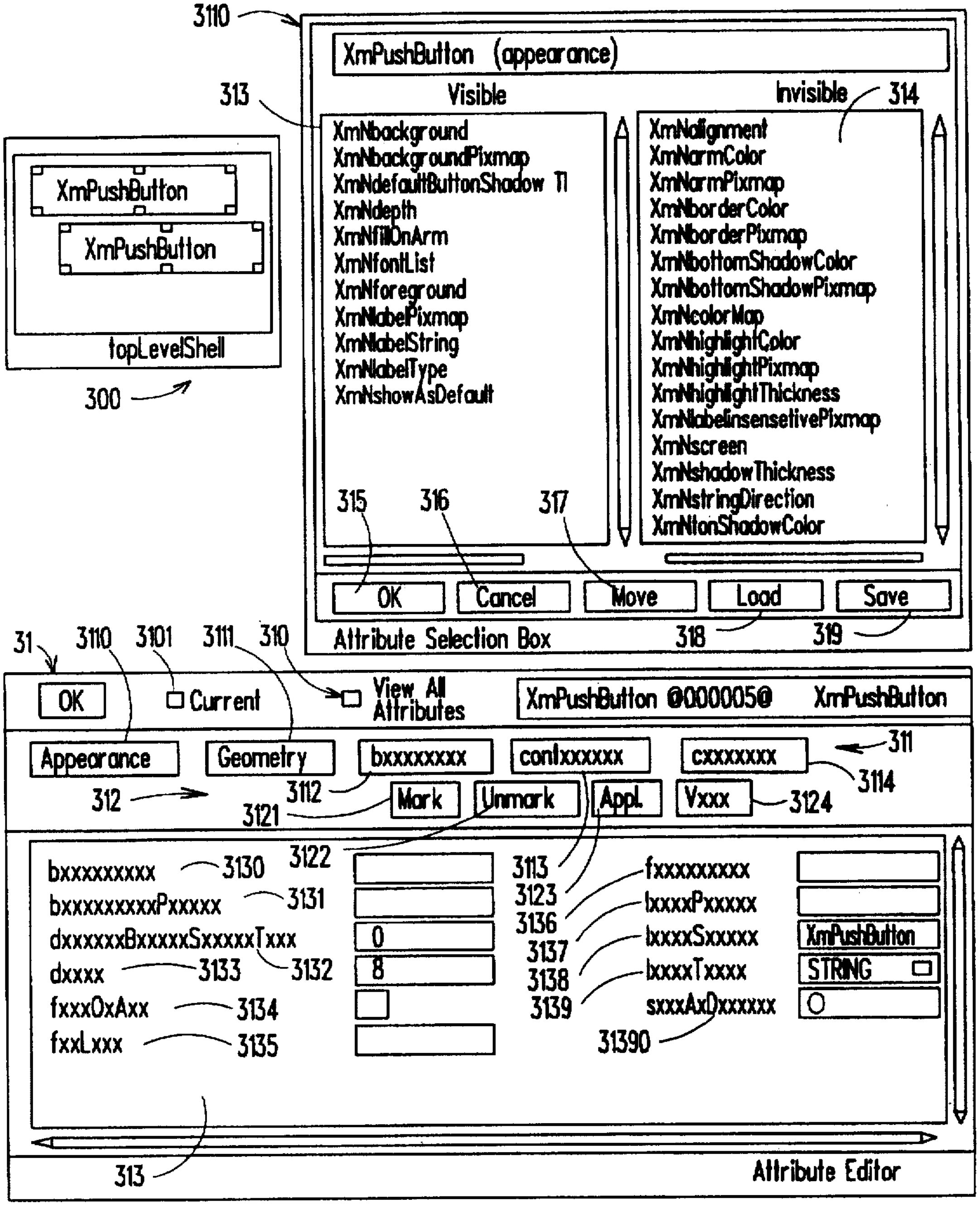
FIGS. 4A and 4B represent windows that are displayed by the software of FIG. 1A that allows the attributes of an interactive object and the callback procedures to be edited.

The cell-type window (as illustrated in FIG. 4A) includes a menu consisting of several overlapping parallel menus (311, 312) accessible using buttons (3110 to 3114 and 3121 to 3124) that act as a tab. Each menu sorts the attributes corresponding to a "widget" category. The categories are the following: appearance, activated with button 3110, geometry, activated with button 3111, behavior, activated with button 3112, constraints, activated with button 3113 and callback procedures, activated with button 3114. This allows the user to easily access a particular attribute among the numerous attributes provided by the X/MOTIF software.

In FIG. 4A, the menu button that corresponds to the appearance (3110) is illustrated near the other buttons (3111, 3112, 3113, 3114) as being pressed, or in the background. The appearance attribute editor, corresponding to the button shown in the foreground, has been activated by a mouse click in the button area and displays the corresponding window (313) in order to allow the user to edit the attributes. For FIG. 4A, this will be the window in which part 313 includes attributes that allow the user to define the appearance of the "widget" while editing. These attributes include a text area that allows the user to define the background in zone 3130, the background of the point matrix in zone 3131, the shading thickness of the default button in zone 3132, the depth in zone 3133, the list of character fonts in zone 3135, the foreground in zone 3136, the matrix point label in zone 3137, the string label in zone 3138 (shown here in the XmPushButton event) the label type in zone 3139, and the default appearance in zone 31390.

The attributes that are displayed in a window section are visible attributes that appear when the button labeled "current" (3101) is pressed.

Attributes are described in the traditional manner, by clicking the mouse when the arrow is in the desired attribute text area and by entering the text and numerical values using the keyboard. Once each attribute is defined, the selection button (3123) will activate the (Apply) command that allows the user to initiate global validation of all attributes that were modified during an iteration with the attribute editing sheet. When button 3122 is selected, the "unmark" command is activated. This command allows the user to cancel all changes made before a global validation. When selection button 3121 is selected, the "mark" command is activated and the user can validate the modifications without initiating a global validation.

When button 3124 is selected, the "view" command is activated. This command allows the user to send an attribute name from the list of visible attributes to the list of invisible attributes and vice-versa.

When this button (3124) is pressed by clicking the mouse when the arrow in the button area, it activates a display function of window 3110 in the middle of the attribute editor that allows the user to view the visual attributes shown in zone 313 and the invisible attributes shown in zone 314 of window 3110 at the same time.

This window (3110) also includes function buttons that allow the user to validate the selection using the OK button, to invalidate the selection of the changes made using button 316, to move an attribute from the visible area to the invisible area or vice-versa using button 317, to load the attributes using button 318 and to save the selection or the modifications that have been made using button 319.

An additional command (310) provided in the form of a radio button is available for the "view all attributes" button in the attribute editing form. This button allows the user to ignore the visibility specifications and to display all the attributes in window 313. When the current radio button (310) is selected, only those attributes having the visible specification are displayed in window 313.

Selecting the "geometry" menu, using button 3111, will activate an editing function that allows the user to display selection and modification attributes of a widget's geometry. The "behavior" menu, activated using button 3112, allows the user to activate an editing function that will display the attribute that defines a widget's behavior and what its behavior will be when using the attributes selected.

When button 3113 is selected, the constraint editing form is activated and the user can display the constraint attributes attached to a given object.

According to the object type, the editors are inactive.

For example, for push buttons whose attributes are defined in window 31, the constraint editing function and the global validation function are inactive. In this case, the title appears shaded, as illustrated for buttons 3113, 3123.

Finally, when button 3114 is selected, the user can activate the editing function of callback procedures.

Figure 4B:
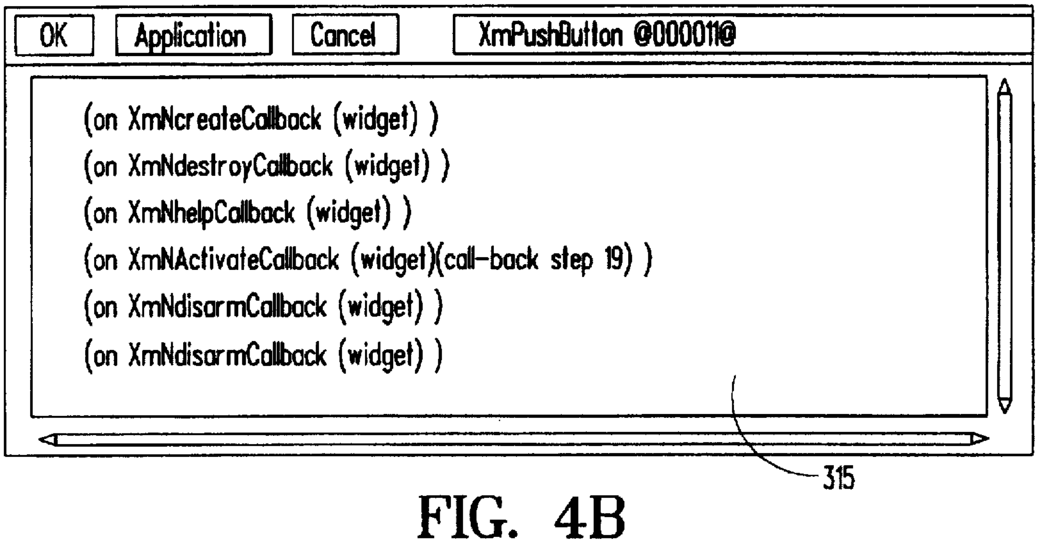

The callback procedure section is simply a text area in which the interactive "widget" callback procedures can be edited. This section is represented in a magnified view in FIG. 4B. Above the dialogue area for the callback procedures, there is a text box that allows the user to display information about the edited "widget", such as its name and reference number. One callback procedure is coded here in the WOOL language. A base model is given for each possible callback procedure of a "widget". For example, in order to edit the WOOL code that is executed when a push button is pressed, the base model is (on XmN activate callback (widget)). A pseudo callback (XmN create callback) has been added. This callback is called by EGERIA when an interface description (14) is loaded after all its child "widgets" that were created in the same description file have been created. Additional attributes can be created inside "XmN create callback".

When selecting parent objects (such as XmDrawingArea, which is the parent of XmFrame, XmLabel, XmScale and XmSeparator (ref. Appendix 4)) is not possible to directly edit the attributes of a "Shell" object or a "Top level widget" (XmTopLevelShell) general object. It is necessary to use the "Select parent" command and then activate the attribute editor.

Interactive objects ("widgets") that have been created, depend a lot on the current state of the X/defaults file. The names given to the objects can be used to set the default values of objects that are created, if the values have not been fixed by the editor. A minimum set of fixed default values that can be used by EGERIA may be those defined in the X/defaults file (13) (for example, see Appendix 1).

Using UNIX events, a translation table contained in the X/defaults file can also activate the internal EGERIA functions. Thus, one event, (see (21) in Appendix 2) allows the user to select and move the widget(s) selected using the left mouse button. The "EgSelect" button allows the user to select a "widget" under the pointer and the "EgMove" function allows the user to move the selected "widget". The left mouse button activates the "Shift" key at the same time and allows the user to add the designated object to the list of selected objects (see (22) in Appendix 2). In fact, the EgSelect or Unselect function allows the user to select or deselect an object designated by the pointer. This function works like a toggle. Finally, pressing the right mouse button, which activates the event (as indicated by (23) in Appendix 2), will activate (in UNIX) the EgSetSelect function that allows the user to draw an interactive rectangle and to select objects situated inside the rectangle. The rectangular zone is defined by two corners, the place where the button is pressed and the place where the button is released.

A second minimal translation (refer to Appendix 3), is also installed in the X/Defaults file in order to allow the user to activate the main editing functions using the keyboard. This table calls the Eg WOOL Exec function that activates an expression written in the WOOL language. This expression is the value of the atom given as an argument. The atoms are prefixed with the term custom:" and are defined in the Edcustom. G file. This is the standard method of personalizing the behavior of the base editor.

Figure 5:
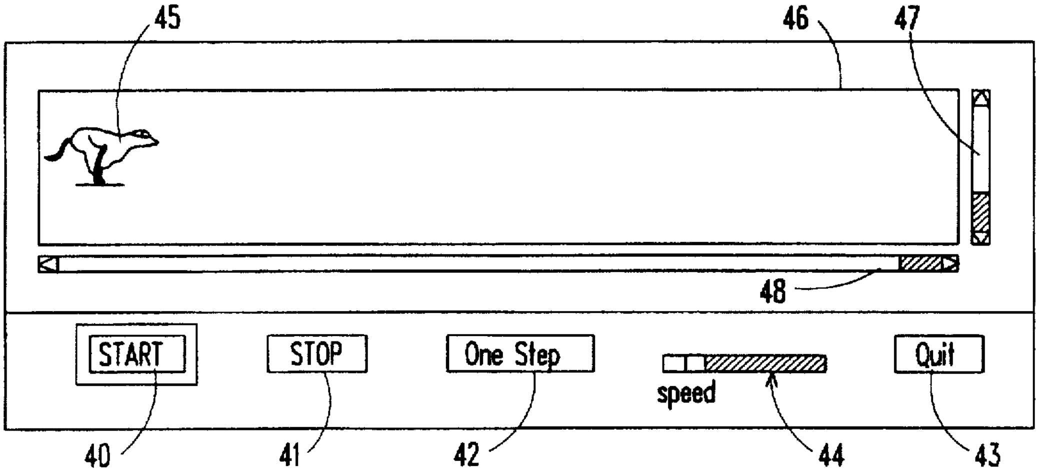
FIG. 5 represents the window defined by an application that is unique to the interface description software of FIG. 1A.

An example application of the interface editor is given below with reference to FIGS. 1 to 4. This example illustrates the edition of an interface that allows the user to display (as shown in FIG. 5) a dog (45) in the process of running. The dog can be moved one step by pressing the "one step" button (42). The dog is started by pressing the "Start" button (40) and the application can be terminated by pressing the "Quit" button (43). The speed of the dog can be selected using a sliding potentiometer (44) and the dog can be stopped using the "stop" button (41).

This application will include several stored images in the "Pixmap pdog" (refer to (52), Appendix 5) memory that will be displayed by moving them into the drawing area. In order to edit the interface, the "widgets" must first be created using the "create" menu. First, a "widget Shell" must be created. In our example this "widget Shell" will be a general "top level" widget or XmToplevelShell (see (40), Appendix 4) that has "@000001@" as an identifier, "eg:widget-root" as a parent and an additional object (see (41), Appendix 4) "DrawingArea". Next, the other "widgets" are created. All of these "widgets" will have an identifier, attributes, an eventual name in EGERIA "eg:name" (for example: "speed-widget" (4510) in Appendix 4) and an eventual script (for example, the script (470) for the "quit" push button (47), as indicated in Appendix 4).

Each time a "widget" is created, the editor will ask the user to indicate the parent and the position. We will create a "DrawingArea" containing scroll bars (see (47, 48), Appendix 4) where the application will draw the dog inside a scrolled window (46) that is defined by the "XmScrolled-Window" object (see (462), in Appendix 4). In order to create objects, the editor uses the customary functions—cut, paste and copy. The list of created or selected objects is manipulated using the left button which allows the user to select or to move the "widget(s)". The left button also allows the user to add the designated object to the list of selected objects when the "Shift" key is pressed. The right mouse button allows the user to select all "widgets" inside a rectangular zone. This zone is defined by two corners according to the place where the button is pressed and the place where it is released. By using the "select parent" operation from the "edit" menu, the "widget" that is selected becomes the parent of the "widget" that was selected. This operation is indispensable, since it allows the user to select a "widget" that is hidden by its child(ren), for example, a parent or a menu. When an object is selected, its class, identification number and eventually its name appear in EGERIA's main window as shown in FIG. 2.

The sizes and positions of "widgets" can be changed using the mouse. The left mouse button is used to select and move the selected "widget(s)". This causes the events to intervene as described above (see (21), Appendix 2.

The right mouse button is used to draw a rectangle in which the objects will be selected and causes the commands described above to intervene (see (23), Appendix 2). The middle mouse button is used to change the size of one or more "widgets" (see (24), Appendix 2).

It is also possible to change the position and the size of several objects at the same time using the operations in the "geometry" menu. This menu includes an "align" operation that allows the user to move selected objects so that they are aligned on the same vertical to the left, to the right, to the center or on the same horizontal to the top, to the bottom or to the center.

The "Resize" operation in the "Geometry" menu allows the user to give the same width and height to selected objects or a minimum or maximum size. The "Distribute" operation allows the user to distribute the selected objects at a regular interval. They can be distributed horizontally or vertically using the rectangle comprising them or inside of their parent.

The editing attributes are used by selected the "Attribute" operation (2021) from the "Edit" menu. This operation allows the user to open a data sheet containing all of the attributes illustrated in FIG. 4A.

Certain attributes cannot be modified after the "widget" has been created. This is the case for the XmscrollingPolicy and XmNscrollBarDisplayPolicy attributes.

We have used the word "script" to designate the code that describes the response to the set of callbacks. The scripts associated to each "widget" are written in WOOL and are described below.

The "Quit" push button allows the user to exit the application. In order for the button to react by calling the "exit" function, as a reaction to the "XmNactivate-Callback" message, the following must be included in the script:

(on XmNactivateCallback(widget) (exit)).

Please note that the "widget" parameter is available. This parameter indicates the "widget" that is currently active (in this case, this is the "Quit" push button). The call_data parameter is not available.

the "step" push button makes the dog advance one step. In order for the button to react to the message "XmNactivateCallback" by calling the "step" callback, defined in the application, the following must be included in the script:

(on XmNactivateCallback ("widget" (call-back dog:step 19))

Once number 19 has been reached, the program will be in the client_data parameter of the C callback corresponding to the "StepCallback"step (see (525), Appendix 5). Using the C:intmovement=(int) client-data (see (526), Appendix 5) instruction it indicates how many pixels the dog should be moved. The C function corresponding to "DrawCallback" (see (523), Appendix 5) in order to draw the dog will be presented later.

The dog is drawn in the drawing area and is redrawn as many times as necessary by calling the draw callback defined in the application:

(On XmNexposeCallback (widget) (call-back draw))

(see (430), Appendix 4)

When this "widget" is created, the application can be initialized by calling the init function using the "call-back init" (see (4311), Appendix instruction. This instruction defines the application callbacks "draw" and "step" by calling the C code "InitCallback (widget,client-data,call-data") and "InitPixmaps" and loads the pixmaps corresponding to the different positions of the dog using the "InitPixmaps" procedure. Moreover, the size of the drawing area is defined in the window-width variable so that the step function makes the dog restart from the left side each time it leaves the right side of the drawing area.

(on XmNcreateCallback ("widget") (call-back init)

(setq window-width (attribute-get "widget" XmNwidth)))

(see (431), Appendix 4)

The window-width variable is updated each time the length of the "widget" is changed with the WOOL instruction:

(on XmNresizeCallback ("widget")

(setq window-width (attribute-get "widget" XmNwidth)))

(see (433), Appendix 4)

Finally, each widget drawing area (ref. (434), Appendix 4) is given a name in order to identify it in the C code where the pixmaps are created. This is accomplished using the EgVariableGetCValue ("drawing-area", . . . ) function (see (522), Appendix 5). It would have been easier to send the "widget" to the init parameter, but using this method the user will be able to see (later on) how a LISP variable is consulted from C.

The "Start" push button makes the dog run. This is accomplished using the work-proc (ref. (441), Appendix 4) function. This function stores an expression that is evaluated each time there is no processing event coming from X. This expression must be evaluated quickly. In our example, it increments a counter (ref. (441), Appendix 4) and advances the dog using the step function (ref. (4412) or (4413), Appendix 4) when a given value is reached. The increment is the value of a "widget" scale (see (451), Appendix 4) identified by a number that is controlled by EGERIA (here @000010@). A "widget's" identifier is displayed when it is selected. It can easily be copied and pasted and its class and eventually its name are displayed.

```
(on XmNactivateCallback ("widget")
  (work-proc
    '(progn
      (setq count (+ count
          (attribute-get @000010@ XmNint-value)))
      (if (> count 100)
        (setq count (- count 100))
        (call-back step 19))))))
        (see(441), Appendix 4)
```

It must be noted that the attribute consulted is XmNintvalue and not XmNvalue. This removes any ambiguity due to the fact that (in WOOL), XmNvalue (for MOTIF) designates an integer for a XmScale and a character string for XmText.

In this last case, XmNString-value must be used.

The counter is initialized when the "widget" is created:

(on XmNcreateCallback (widget) (setq count 0))

The "Stop" push button allows the user to stop the dog-track. This is also accomplished by calling the work-proc (see (442), Appendix 4).

(on XmNactivateCallback (widget) (work-proc()))

A backup of the interface is made using the "Save" command from the "File" menu. Afterwards, the saved file can be reloaded using the "Load" command. A few comments concerning the conventions of names must be noted:

Files belonging to EGERIA are prefixed with (eg-). It is advisable to give the file containing the application interface the name of this application with the par.eg suffix. In our example, we call the interface generated by EGERIA "dog.eg", where dog is the executable file.

If this is not convenient, the name of the file to be loaded in the application's C-source code must be indicated (in a parameter of the EgMain function).

The rest of the application is written in the C language. All the libraries that are used are also written in C (see Appendix 5). If this language is C++, then file modifications are required. For any other language, the description files of the different types, constants and functions must be generated.

The complete source code of the example dog.c is in Appendix 5. In the next few paragraphs we will present only the main elements of this example.

First of all, a description of the toolkit must be included. EGERIA provides the "eg_toolkit.h" file that contains all the published declarations of the MOTIF "toolkit" (see (50), Appendix 5):

#include "eg_toolkit.h".

Then the EGERIA declarations must be included. Thus, the available functions are described in the reference manual:

#include "egeria.h".

Execution control is given to EGERIA using the EgMain function (see (511), Appendix 5).

```
EgMain (layers, XtNumber(layers),
    argc, argv, options, XtNumber(options),
    MODE_EXECUTION
    InitCallback,
    NULL,
    Null, "EGPATH");
```

The most important parameter, InitCallback (ref. (5110), Appendix 5) records the callback that initializes the application and records the other callbacks. This callback is called from the interface using (callback init).

It is advisable to rework the sample code given in dog. C. Only the callbacks will be changed for other applications.

The EgMain function and its parameters allow the user to make the necessary initializations and then call "EgAppMainLoop", which loops after calling XtAppNextEvent and EgDispatchEvent.

The callback InitCallback has two roles: to initialize the application and record the links between the interface and the application.

For the application, in our example, pixmaps are created that correspond to the different steps of the dog track in the InitPixmaps function.

For links, the callbacks "DrawCallback" and "StepCallback" are recorded with the application under the names "draw" and "step" because of the EgCallbackDefine function. Also a somewhat unique window-width LISP variable is used because it will share the address with the C window-width variable.

```
void
InitCallback(widget, client_data, call_data)
  Widget widget;              /* UNUSED */
  caddr_t client_data         /* UNUSED */
  caddr_t call_data           /* UNUSED */
{
  InitPixinaps ( );
  EgCallbackDefine ("Draw", DrawCallback);
  EgCallbackDefine ("step", StepCallback);
  EgPointerDefine ("window-width", &windowWidth);
}
void
DrawCallback (widget, client_data, call_data)
  Widget widget;              /* UNUSED */
  caddr_t client_data         /* UNUSED */
  caddr_t call_data           /* UNUSED */
{
  XCopyArea (DISPLAY,pdog[current],
drawingAreaWindow,
        gc, 0, 0,
wdog[current], Hdog[current]
        xdog, ydog);
}
void
StepCallback(widget, client_data, call_data)
  Widget widget;              /* UNUSED */
  caddr_t client_data         /* UNUSED */
  caddr_t call_data           /* UNUSED */
{
  int movement = (int) client_data;
  XClearArea(DISPLAY, drawingAreaWindow),
        xdog, ydog, WIDTH, HEIGHT, False),
  xdog += movement;
  if (movement > 0) {
    if (xdog >= windowWidth) xdog =0;
    current++;
    if (current > 5) current = ;
  }else{
    if (xdog < à) xdog = windowWidth;
    current—;
    if(current < 0) current = 5;
}
  XCopyArea(DISPLAY,
pdog[current], drawingAreaWindow,
    gc, 0, 0, wdog[current], hdog[current],
    xdog, ydog);
```

The pixmaps are created in the InitPixmaps function. In order to do this, it is necessary to know in which widget they will be designed. Therefore, the LISP drawing-area variable is consulted.

```
if (!EgvariableGetValue("drawing-area",
            egClassWidget,
            &drawingArea)) {
    fprintf (stderr,
      "drawing area must be specified\n");
    exit (-1);
```

The value of a LISP variable can also be changed in C. It must be noted that this method is found in other systems that are not necessarily based on a LISP interpreter. This means that an application that uses these functionalities is not dependant on EGERIA.

After the application has been compiled, link editing with the EGERIA library libEg.a and with the libraries required by OSF/MOTIF (libXm.a, libXt.a and libXll.a) must be completed.

The resulting program allows the user to edit the interface if it is executed before the -edit option:

EGPATH=.:/user/local/lib/Xll/eg dog -edit&.

All changes or modifications within reach of craftsmen are an integral part of the spirit of this invention.

APPENDIX 1

```
EGERIA*background:              AntiqueWhite3
EGERIA*XmTest*background:       AntiqueWhite2
EGERIA*XmList*background:       AntiqueWhite2
EGERIA*foreground: black

EGERIA*FonList: -adobe-times-bold-r*-*-12-*-75-*-*-*-*-*

EGERIA*XmToggleButton.indicatorSize :    18

EGERIA*selectionPolicy : SINGLE_SELECT
EGERIA*listSizePolicy: CONSTANT
EGERIA*XmList.visibleItemCount :7
```

36

APPENDIX 2

```
"Shift"Ctrl<Btn1Down>:    EgSelect() EgMove()\n\ —21
"Shift"Ctrl<Btn2Down>:    EgSelect() EgResize()\n\ —24
"Shift"Ctrl<Btn1Down>:    EgSelectOrUnselect()\n\ —22
"Shift"Ctrl<Btn2Down>:    EgSelectOrUnselect()\n\
"Shift"Ctrl<Btn3Down>:    EgSelect()\n\ ———— 23
```

37

APPENDIX 3

```
EGERIA*object.translations: #override\

    <keyPress>e:    EgWoolExec(custom:Edit)\n\
    <keyPress>p:    EgWoolExec(custom:EditParent)\n\
    <keyPress>x:    EgWoolExec(custom:Cut)\n\
    <keyPress>c:    EgWoolExec(custom:Copy)\n\
    <keyPress>v:    EgWoolExec(custom:Paste)\n\
    <keyPress>d:    EgWoolExec(custom:Delete)
```

38
APPENDIX 4

```
;; ------------------------------------------------------------
;;
;;   Interface description generated by EGERIA for toolkit MOTIF
;;
;; ------------------------------------------------------------

(eg:layer-check 'Egeria 2000036)
(eg:layer-check 'Xt 11004)
(eg:layer-check 'MOTIF 1001)

(ldi:interface
 (ldi:widget
   XmTopLevelShell
   (
     parenteg:widget-root
     ident"@000001@"
     eg:name""
   )
   (
     XmNwidth763
     XmNheight303
     XmNx30
     XmNy411
   )                           } 40
   ()
   ()
   (
    (ldi:widget
      XmDrawingArea
      (
        ident"@000002@"
        eg:name""
      )
      (
        XmNborderWidth1
        XmNx0
        XmNy0
        XmNwidth765
        XmNheight303
        XmNmarginWidth0
      )                        } 41
      ()
      ()
      (
```

39
APPENDIX 4 (CONT'D)

```
(ldi:widget
 XmScrolledWindow
 (
  ident"@000003@"
  eg:name""
 )

  XmNscrollingPolicyXmAUTOMATIC
  XmNscrollBarDisplayPolicyXmAS_NEEDED
  XmNx21
  XmNy39
  XmNwidth718
  XmNheight148
)                                          462
()
()
(
 (ldi:widget
  XmDrawingArea—434
  (
   ident"@000005@"
   eg:name"drawing-area"
4311  script"(on XmNcreateCallback (widget) \n
 (call-back init)\n (setq dog:window-width (attribute-get widget XmNwidth)))\n\   431
 (on XmNdestroyCallback (widget) )\n\
 (on XmNhelpCallback (widget) )\n\
 (on XmNresizeCallback (widget) \n
  (setq dog:window-width (attribute-get widget XmNwidth)))\n\   433
 (on XmNexposeCallback (widget) \n\— 430
  (call-back dog:draw))\n\ ——— 435
 (on XmNinputCallback (widget) )\n\—432
 "
  )
  (
   XmNborderWidth0
   XmNx0
   XmNy0
   XmNwidth711                               436
   XmNheight163
   XmNresizePolicyXmRESIZE_NONE
  )
  ()
  ()
  ()
  ))
```

40

APPENDIX 4 (CONT'D)

```
 )
 (ldi:widget
  XmFrame
  (
   ident"@000C06@"
   eg:name""
  )
  (
   XmNshadowThickness1
   XmNmarginWidth5
   XmNmarginHeight5
   XmNshadowTypeXmSHADOW_IN
   XmNx62
   XmNy238
   XmNwidth59
   XmNheight35                                       } 44
  )
  ()
  ()
  (
   (ldi:widget
    XmPushButton
    (
     ident"@000007@"
     eg:name""
     script"(on XmNcreateCallback (widget) (setq count 0))\n(on
XmNdestroyCallback (widget) )\n\
(on XmNhelpCallback (widget) )\n\
(on XmNactivateCallback (widget) \n\
 (setq dog:max 400) \n\
 (work-proc \n\        4411
  \'(progn\n\
    (setq count (+ count (attribute-get @000010@ XmNInt-value)))\n\
    (if (> count dog:max)\n\
       (progn\n\
        (setq count (- count dog:max))\n\
        (call-back dog:step 19))\n\
       (if (< count 0)\n\ 4412
          (progn\n\
\t(setq count (+ count dog:max))\n\
\t(call-back dog:step -19)))))))\n\ —— 4413
(on XmNarmCallback (widget) )\n\
(on XmNdisarmCallback (widget) )\n\               } 441
"
    )
    (
     XmNlabelString"START"
     XmNx6
     XmNy6
     XmNwidth47
     XmNheight23
   )
```

41

APPENDIX 4 (CONT'D)

```
        ()
        ()
        ()
        ))
      )
     (ldi:widget
      XmPushButton
      (
       ident"@000008@"
       eg:name""
       script"(on XmNcreateCallback (widget) )\n(on XmNdestroyCallback
(widget) )\n(on XmNhelpCallback (widget) )\n\
(on XmNactivateCallback (widget) (work-proc ()))\n\ —— 442
(on XmNarmCallback (widget) )\n\
(on XmNdisarmCallback (widget) )\n\
"
      )
      (
       XmNlabelString"STOP"
       XmNx214
       XmNy244
       XmNwidth41
       XmNheight22
      )
      ()
      ()
      ()
      )
     (ldi:widget
      XmPushButton
      (
       ident"@000009@"
       eg:name""
       script"(on XmNcreateCallback (widget) )\n(on XmNdestroyCallback
(widget) )\n(on XmNhelpCallback (widget) )\n\
(on XmNactivateCallback (widget) (call-back dog:step 19))\n\
(on XmNarmCallback (widget) )\n\
(on XmNdisarmCallback (widget) )\n\
"
      )
      (
       XmNlabelString"one step"
       XmNx354
       XmNy244
       XmNwidth56
       XmNheight23
      )
      ()
      ()
```

APPENDIX 4 (CONT'D)

```
  ()
  )
(ldi.widget
  XmScale
  (
   ident"@000010@"
   eg:name"speed-widget"—4510
  )
  (
   XmNorientationXmHORIZONTAL
   XmNtitleString"speed"
   XmNshowValue"True"                              451
   XmNx460
   XmNy231
   XmNwidth161
   XmNheight52
   XmNscaleWidth300
   XmNscaleHeight15
   XmNprocessingDirectionXmMAX_ON_RIGHT
   XmNvalue10
   XmNminimum-10
   XmNmaximum40
  )
  ()
  ()
  ()
  )
(ldi:widget
  XmSeparator
  (
   ident"@000011@"
   eg:name""
  )
  (
   XmNwidth761
   XmNheight20
   XmNx2
   XmNy204
  )
  ()
  ()
  ()
  )
```

APPENDIX 4 (CONT'D)

```
(ldi:widget
  XmPushButton
  (
   ident"@000012@"
   eg:name""
   script"(on XmNcreateCallback (widget) )\n(on XmNdestroyCallback
(widget) )\n(on XmNhelpCallback (widget) )\n\
on XmNactivateCallback (widget) (exit))\n\
on XmNarmCallback (widget) )\n\
(on XmNdisarmCallback (widget) )\n\
"
      )
      (
       XmNlabelString"QUIT"
       XmNx672
       XmNy244
       XmNwidth32
       XmNheight21
      )
      ()
      ()
      ()
      )
     (ldi:widget
      XmLabel
      (
       ident"@000013@"
       eg:name""
      )
      (
       XmNalignmentXmALIGNMENT_BEGINNING
       XmNmarginWidth0
XmNfontList"-adobe-helvetica-bold-r-normal--14-140-75-75-p-82-iso8859-1"
       XmNlabelString"Demonstration of the EGERIA Interface Editor
(built on OSF/MOTIF)"
       XmNx149
       XmNy10
       XmNwidth466
       XmNheight20
      )
      ()
      ()
      ()
      ))
    ))
  )
)
;; ---------------------------------------------------------------------
```

470

47

44
APPENDIX 5

```
/*****************************************************\
            Application: Link with User Interface part
\*****************************************************/

#include "eg_toolkit.h"   50
#include "egeria.h"
#include <stdio.h>

void InitCallback();    /* (widget, client_data, call_data) */

/*==================================*\
  Initialisation of EGERIA
\*==================================*/

/*-------------------------*\
   Constant values|
   (if not defined in Makefile)
\*-------------------------*/

#ifndef APPLICATION_PATH_VARIABLE
#define APPLICATION_PATH_VARIABLE "EGPATH"
#endif

#ifndef APPLICATION_PATH
#define APPLICATION_PATH  NULL
#endif

#ifndef PROFILE_NAME
#define PROFILE_NAME NULL
/* That means: <command name>.eg */
#endif

XrmOptionDescRec options[] = {
    {"-edit",    ".mode",   XrmoptionNoArg,  "uids"},
    {"-exec",    ".mode",   XrmoptionNoArg,  "uims"},
    {"-wool",    ".dialog", XrmoptionNoArg,  "wool"},
    {"-wcl",     ".dialog", XrmoptionNoArg,  "wcl"},
    {"-profile", ".profile",XrmoptionSepArg, (caddr_t) NULL}
};
```
} 51

45
APPENDIX 5 (CONT'D)

```
/*----------------------------*\
   Egeria version
   Used to check version
   CAUTION: Read the modification
   before to change this number
\*----------------------------*/

#define EgVERSION 2
#define EgREVISION 0
#define EgVersion EgVERSION * 1000 + EgREVISION

EgLayer layers[] = {
    {"Egeria", EgVersion},
    {"Xt", XtVersion},
    {"MOTIF", XmVersion}
};

/*----------------------------*\
   Egeria main loop
\*----------------------------*/

int
main (argc, argv)
   int argc;
   char *argv[];
{
   return EgMain(layers, XtNumber(layers),
  argc, argv, options, XtNumber(options),
  /* MODE_EDITION */ MODE_EXECUTION,
  InitCallback, ———— 5110
  PROFILE_NAME,
  APPLICATION_PATH, APPLICATION_PATH_VARIABLE);
}                                                  511

/*==================================*\
Application part
\*==================================*/
Widget drawingArea;
Display *EgDisplay;
Window drawingAreaWindow;

#define PIXMAP_NUMBER 7
#define PIXMAP_NAME "dog"
Pixmap ppixmap[PIXMAP_NUMBER];/* Pixmaps */
unsigned int wpixmap[PIXMAP_NUMBER],
hpixmap[PIXMAP_NUMBER], HEIGHT = 0,
WIDTH = 0; /* sizes */                  52

GC gc;

#define DEFAULT_PIXMAP 2

int xpixmap = 0, ypixmap = 25, current = 0;
int windowWidth = 100;
```

46

APPENDIX 5 (CONT'D)

```
/*------------------------------*\
   Utilities
\*------------------------------*/

int
ReadPixmap(pixmapName, pixmapPtr, widthPtr, heightPtr)
char * pixmapName;
Pixmap * pixmapPtr;
unsigned int * widthPtr, * heightPtr;
{
    XrmValue from_value, to_value;
    int dummy;

    from_value.size = strlen(pixmapName) + 1;
    from_value.addr = pixmapName;

    XtConvert(drawingArea, XtRString, &from_value,
      XmRManForegroundPixmap /* XmRPrimForegroundPixmap */,
         &to_value);
    if (to_value.addr == NULL ||
* (Pixmap *) to_value.addr == DEFAULT_PIXMAP) {
return False;
    } else {
unsigned long int dummy;
Status status;

* pixmapPtr = * (Pixmap *) to_value.addr;
status = XGetGeometry(EgDisplay, * pixmapPtr,
     &dummy, &dummy, &dummy,
     widthPtr, heightPtr,
     &dummy, &dummy);
return True;
    }
}

void
InitPixmaps()
{
    XGCValues gcv;
    int i;
    char name[100];

    if (!EgVariableGetCValue ("drawing-area", EgClassWidget, &drawingArea))
{                                                                   522
fprintf(stderr, "drawing-area must be specified\n");
exit (1);
    }
    EgDisplay = XtDisplay(drawingArea);
    drawingAreaWindow = XtWindow(drawingArea);
```

47

APPENDIX 5 (CONT'D)

```
   /* to avoid event accumulation during animation */
   gcv.graphics_exposures = False ;
   gc = XCreateGC(EgDisplay, drawingAreaWindow, GCGraphicsExposures,
&gcv);
   for (i = 0; i < PIXMAP_NUMBER; i++) {
#ifdef    BULL        /* Kriss */    /* DATE : 06 Jun 91 */
      sprintf(name, "/usr/lib/X11/Egeria/dog/%s%d.xbm", PIXMAP_NAME, i);
#else  /* BULL */     /* Kriss */    /* DATE : 06 Jun 91 */
      sprintf(name, "%s%d.xbm", PIXMAP_NAME, i);
#endif  /* BULL */     /* Kriss */    /* DATE : 06 Jun 91 */
if (! ReadPixmap(name, &ppixmap[i], &wpixmap[i], &hpixmap[i])) {
   fprintf(stderr, "file %s is not found\n", name);
   exit (-1);
}
if (hpixmap[i] > HEIGHT) HEIGHT = hpixmap[i];
if (wpixmap[i] > WIDTH) WIDTH = wpixmap[i];
   }
}

/*------------------------------*\
  Callback functions
\*------------------------------*/

void
DrawCallback(widget, client_data, call_data)
   Widget widget;/* UNUSED */
   caddr_t client_data;/* UNUSED */
   caddr_t call_data;/* UNUSED */
{
   XCopyArea(EgDisplay, ppixmap[current], drawingAreaWindow,
     gc, 0, 0, wpixmap[current], hpixmap[current],
     xpixmap, ypixmap);
}

void
UndrawCallback(widget, client_data, call_data)
   Widget widget;/* UNUSED */
   caddr_t client_data;/* UNUSED */
   caddr_t call_data;/* UNUSED */
{
   XClearArea(EgDisplay, drawingAreaWindow,
     xpixmap, ypixmap, wpixmap[current], HEIGHT, False);
}
```

523

48

APPENDIX 5 (CONT'D)

```
void
StepCallback(widget, client_data, call_data) ———525
   Widget widget;/* UNUSED */
   caddr_t client_data;/* movement */
   caddr_t call_data;/* UNUSED */
{
   int movement = (int) client_data; ——————— 526

   XClearArea(EgDisplay, drawingAreaWindow,
     xpixmap, ypixmap, WIDTH, HEIGHT, False);

   xpixmap + = movement ;
   if (movement > 0) {
if (xpixmap > = windowWidth) xpixmap = 0;
current + +;
if (current > = PIXMAP_NUMBER) current = 0;
   } else {
if (xpixmap < 0) xpixmap = windowWidth;
current--;
if (current < 0) current = PIXMAP_NUMBER - 1;
   }

   XCopyArea(EgDisplay, ppixmap[current], drawingAreaWindow,
     gc, 0, 0, wpixmap[current], hpixmap[current],
     xpixmap, ypixmap);
}

void                                                  }
InitCallback(widget, client_data, call_data)          }
   Widget widget;/* UNUSED */                         }
   caddr_t client_data;/* UNUSED */                   } 532
   caddr_t call_data;/* UNUSED */                     }
{                                                     }
   InitPixmaps();                                     }

   EgPointerDefine("dog:window-width", EgClassInt, &windowWidth);

530 —— EgTypedCallbackDefine("dog:draw", DrawCallback, EgClassAny);
   EgTypedCallbackDefine("dog:step", StepCallback, EgClassInt); ———531
   EgTypedCallbackDefine("dog:undraw", UndrawCallback, EgClassAny);
}

/***************************************************/
```

49

APPENDIX 6

6.1 WOOL CORE PART

6.1.1 Syntax

| Function | Action |
|---|---|
| ; | [W1&2][CL526] WOOL comment |
| | [W1&2][CL 16] integer |
| | [W1&2][CL=27] symbol |
| "..." | [W1&2][CL≠33] string notation |
| (...) | [W1&2] list notation |
| ' | [W1&2][CL 115] prevent evaluation |
| () | [W1&2][CL 96] the nil value |
| nil | [W1&2][CL 96] the nil value |

6.1.2 Basic

| Function | Action |
|---|---|
| ' | [W1&2][CL 115] prevent evaluation |
| quote | [W1&2][CL 115] prevent evaluation |
| () | [W1&2][CL 96] the nil value |
| nil | [W1&2][CL 96] the nil value |
| defsetf | [W2][CL138] define an assignation function for setf |
| load | [W1] load and execute a WOOL file |
| load | [W2][CL 657] load and execute a WOOL file |
| *load-pathname* | [W2] directory path used by load |
| provide | [W2][CL 277] manage file loading |
| require | [W2][CL 277] manage file loading |
| setf | [W2][CL 124] general assignation |
| setq | [W2][CL 122,121] variable assignement |
| set | [W2][CL 122,121] variable assignement |

APPENDIX 6 (CONT'D)

6.1.3 Control

| Function | Action |
| --- | --- |
| catch | [W2][CL 187] non-local goto |
| cond | [W1&2][CL 158] conditional test |
| dolist | [W2][CL 169,395] iterate through a sequence (list or string) |
| dotimes | [E1][W2][CL 169] loop from zero to n-1 |
| do | [E1][W2][CL 164] general loop |
| end | [W1] terminate execution |
| error-catch | [W1] [?] trap errors occuring in expressions |
| error-trigger | [W1] trigger a WOOL error |
| eval | [W1&2] evaluate a WOOL expression |
| every | [E1] LISP traditional iterators |
| exit | [W1] non-local goto |
| exit | [W2] terminate execution |
| for | [W1] iterate through a list of values |
| ifn | [E1][old] conditional test |
| if | [W1&2] conditional test |
| mapcan | [E1] LISP traditional iterators |
| mapcar | [E1] LISP traditional iterators |
| mapfor | [W1] iterate through a list of values |
| map | [W2][CL 169,395] iterate through a sequence (list or string) |
| progn | [W1&2][CL 147] sequence of instructions |
| some | [E1] LISP traditional iterators |
| tag | [W1] non-local goto |
| throw | [W2] [CL 187] non-local goto |
| unless | [E1] [?] negative conditionnal test |
| unwind-protect | [W2] [CL 188] ensure execution of code |
| when | [E1] [?] positive conditionnal test |
| while | [W1] [?] while loop |

51

APPENDIX 6 (CONT'D)

6.1.4 Function

| Function | Action |
|---|---|
| ' | [W2] prevent evaluation with possible internal evaluations |
| backquote | [W2] prevent evaluation with possible internal evaluations |
| defmacro | [E1] define a WOOL macro |
| defmacro | [W2][CL 76,195] define a WOOL function |
| defunq | [W1] define a WOOL function |
| defun | [W1] define a WOOL function |
| defun | [W2][CL 76,195] define a WOOL function |
| de | [W1] define a WOOL function |
| df | [W1] define a WOOL function |
| dm | [E1] define a WOOL macro |
| flambda | [W1] define a WOOL function |
| lambdamacro | [W2][CL 76,195] define a WOOL function |
| lambda | [W1] define a WOOL function |
| lambda | [W2][CL 76,195] define a WOOL function |

6.1.5 Any

| Function | Action |
|---|---|
| /= | [W2] [CL ≠ 293] test inequality of objects |
| convert | [E1] convert a value |
| copy | [E1] [W2] copy of a WOOL object |
| eq | [W1&2] test strict equality of any two objects |
| equal | [W1&2] [CL 107] test equality of any objects |
| object-plist | [E2] return property-list associated with an object |
| print | [W1&2] [CL ≠577] print WOOL objects |
| ? | [W1] print WOOL objects |
| *print-readably* | [W2] [CL 577] affect the way objects are printed |
| type-of | [W1&2] [CL 65] type of a WOOL object |
| type-of | [E1] [CL 65] type of a WOOL object |
| typep | [W1] [CL 67] check type of an object |

APPENDIX 6 (CONT'D)

6.1.6 Hash Table

| Function | Action |
|---|---|
| gethash | [W2] [CL 438] retrieves entry in an hash table |
| make-hash-table | [W2][CL 436] make an hash table |
| maphash | [W2][CL 438] apply function on each enties in hash table |
| remhash | [W2][CL 438] removes entry in hash table |

6.1.7 Input/Output

| Function | Action |
|---|---|
| close | [W2] [CL 505]close a stream |
| error-output | [E1] global streams |
| file-open | [E1] open a stream |
| open | [W2] [CL 646] open a stream |
| output | [E1] global streams |
| print | [W1&2] [CL ≠577] print WOOL objects |
| ? | [W1] print WOOL objects |
| read-char | [W2][CL 573,579] read or write a char |
| read-line | [W2][CL 572,579] read or write a line |
| read | [old] read a string from the current stream |
| read | [W2][CL 569] read an expression |
| *standard-error* | [W2][CL 497] global streams |
| *standard-input* | [W2][CL 497] global streams |
| *standard-output* | [W2][CL 497] global streams |
| stderr | [E1][W2] initial global streams |
| stdin | [E1][W2] initial global streams |
| stdout | [E1][W2] initial global streams |
| write-char | [W2][CL 573,579] read or write a char |
| write-line | [W2][CL 572,579] read or write a line |

APPENDIX 6 (CONT'D)

6.1.8 List

| Function | Action |
|---|---|
| nil | [W1&2] [CL 96] the nil value |
| + | [W1&2] [CL 295] add or concatenate |
| nth | [G1] access an element of a list |
| replace-nth | [G1] physically replace an element of a list |
| append | [W2] append sequences (lists or strings) |
| nconc | [W2] append sequences (lists or strings) |
| consp | [E1] test for a list |
| delete | [W2][CL 400][2] remove from a sequence (list or string) |
| delete-nth | [G1] physically remove an element of a list |
| dolist | [W2] [CL 169,395] iterate through a sequence (list or string) |
| map | [W2] [CL 169,395] iterate through a sequence (list or string) |
| elt | [W2] get an item in a sequence (list or string) |
| for | [W1] iterate through a list of values |
| mapfor | [W1] iterate through a list of values |
| lenght | [W1&2] length of sequence (list or string) |
| list | [W1&2] make a list |
| list-add | [E1][E2] add an element at the end of a list |
| list-add! | [E1][E2] add an element at the end of a list |
| list-append | [E1][E2] append a list to an other one |
| list-append! | [E1][E2] append a list to an other one |
| list-get | [E1][E2] get or set item in a list |
| list-put | [E1][E2] get or set item in a list |
| list-put! | [E1][E2] get or set item in a list |
| list-make | [E1&2] make a list of a given size |
| list-remove | [E1][E2] remove from a list |
| list-remove! | [E1][E2] remove from a list |
| list-sort! | [E1][E2] sort a list in place |
| make-list | [W2][CL 418] make a list of a given size |
| mapcar | [E1] LISP traditional iterators |
| mapcan | [E1] LISP traditional iterators |
| some | [E1] LISP traditional iterators |
| every | [E1] LISP traditional iterators |
| member | [W1] position of element in a list or in string |
| position | [W2][CL404] position of element in sequence (list or in string) |
| print-level | [W1&2][CL 564] control printing depth of lists |
| reverse | [W2][CL 393] reverse items in a list |
| sort | [W1&2][CL 408] sort a list in place |
| sublist | [W1] extract a sub-list out of a list |
| subseq | [W2][CL 393] extract a sub-part out of a sequence (list or string) |

APPENDIX 6 (CONT'D)

6.1.9 Logical

| Function | Action |
|---|---|
| and | [W1&2] logical AND of expressions |
| not | [W1&2] [CL 110] logical negation |
| null | [E1] logical negation |
| or | [W1&2][CL 110] logical OR of expressions |
| t | [W1&2][CL 96] the logical "true" value |

6.1.10 Number

| Function | Action |
|---|---|
| mod | [W2] [CL 353] modulo |
| * | [W1&2] [CL 296] arithmetic operators |
| / | [W1&2] [CL 296] arithmetic operators |
| + | [W1&2] [CL 295] add or concatenate |
| - | [W1&2] [CL 295] arithmetic difference |
| < | [W1&2] [CL 293] test for strict inferiority |
| < = | [E1][W2][CL 293] test for inferiority |
| > | [W1&2][CL 293] test for strict superiority |
| > = | [E1][W2][CL 293] test for superiority |
| atoi | [W1] ascii string to integer conversion |
| compare | [W1&2] ordering comparison |
| itoa | [W1] integer to ascii string conversion |
| logand | [E1][W2] bitwise operators |
| logior | [E1][W2] bitwise operators |
| logxor | [E1][W2] bitwise operators |
| lognot | [E1][W2] bitwise operators |
| min | [E1][W2][CL 294] give the min or max of a list of numbers or strings |
| max | [E1][W2][CL 294] give the min or max of a list of numbers or strings |
| numberp | [E1] test if it is a number |

6.1.11 Object

| Function | Action |
|---|---|
| class-name | [W2] [CL 821] returns name of a class |
| class-of | [W2] [CL 822] returns class of an object |
| defclass | [W2] [CL 822] define a class |
| defmethod | [W2] [CL 838] define a method |
| make-instance | [W2] [CL 848] make an instance of a given class |
| print-object | [W2] [CL 850] method |
| slot-value | [W2] [CL 857] get slot value of an object |

55

APPENDIX 6 (CONT'D)

6.1.12 Package

| Function | Action |
|---|---|
| boundp | [W1&2] [CL 120] test if an symbol has already been defined |
| defvar | [W2] [CL 86] defines variable or constant |
| defconstant | [W2] [CL 86] define variable or constant |
| defun | [W2] [CL 76,195] define a Wool function |
| defmacro | [W2] [CL 76,195] define a Wool function |
| find-package | [W2] [CL 264] find package from its name |
| intern | [E1] make an symbol from a string |
| intern | [W2] [CL 266] make an symbol from a string |
| make-package | [W2] [CL 262] make a package |
| *package* | [W2] [CL 262] current package |
| use-package | [W2] [CL 269] indicates packages used |

6.1.13 Sequence

| Function | Action |
|---|---|
| + | [W1&2] [CL 295] add or concatenate |
| append | [W2] append sequences (lists or strings) |
| nconc | [W2] append sequences (lists or strings) |
| delete | [W2] [CL 400][?] remove from a sequence (list or string) |
| dolist | [W2] [CL 169,395] iterate through a sequence (list or string) |
| map | [W2] [CL 169,395] iterate through a sequence (list or string) |
| elt | [W2] get an item in a sequence (list or string) |
| length | [W1&2] length of sequence (list or string) |
| position | [W2] [CL 404] position of element in sequence (list or in string) |
| subseq | [W2] [CL 393] extract a sub-part out of a sequence (list or string) |

APPENDIX 6 (CONT'D)

6.1.14 String

| Function | Action |
|---|---|
| "..." | [W1&2] [CL=33] string notation |
| + | [W1&2] [CL 295] add or concatenate |
| < | [W1&2] [CL 293] test for strict inferiority |
| < = | [E1][W2][CL 293] test for inferiority |
| > | [W1&2][CL 293] test for strict superiority |
| > = | [E1][W2][CL 293] test for superiority |
| append | [W2] append sequences (lists or strings) |
| nconc | [W2] append sequences (lists or strings) |
| atoi | [W1] ascii string to integer conversion |
| compare | [W1&2] ordering comparison |
| delete | [W2] [CL 400][?]remove from a sequence (list or string) |
| dolist | [W2] [CL 169,395] iterate through a sequence (list or string) |
| map | [W2] [CL 169,395] iterate through a sequence (list or string) |
| elt | [W2] get an item in a sequence (list or string) |
| intern | [E1] make an symbol from a string |
| intern | [W2] [CL 266] make an symbol from a string |
| itoa | [W1] integer to ascii string conversion |
| length | [W1&2] length of sequence (list or string) |
| match | [W1&2] general regular expression matching package |
| position | [W2] [CL 404] position of element in sequence (list or in string) |
| min | [E1][W2][CL 294] give the min or max of a list of numbers or strings |
| max | [E1][W2][CL 294] give the min or max of a list of numbers or strings |
| read-line | [W2] [CL 572,579] read or write a line |
| write-line | [W2] [CL 572,579] read or write a line |
| strcat | [E1] [old] concatenate two strings |
| string-execute | [E1] execute a WOOL string |
| string-upcase | [E1&2][CL 465] change the case of a string |
| string-downcase | [E1&2][CL 465] change the case of a string |
| stringp | [E1] test for a string |
| subseq | [W2] [CL 393] extract a sub-part our of a sequence (list or string) |
| symbol-name | [old] give the name of a symbol |

APPENDIX 6 (CONT'D)

6.1.15 Symbol

| Function | Action |
|---|---|
| atom | [G1] make an dsymbolatom |
| atom | [E1] test if it is an symbol |
| boundp | [W1&2] [CL 120] test if an symbol has already been defined |
| gensym | [E1][E2] generate a symbol |
| intern | [E1] make an symbol from a string |
| intern | [W2] [CL 266] make an symbol from a string |
| symbol-name | [old] give the name of a symbol |
| symbol-plist | [W2][CL 241] return property-list associated with a symbol |
| unbind | [W1] undefine a symbol |
| makunbound | [W2] [CL 120] undefine a symbol |

6.1.16 Variable and Constant

| Function | Action |
|---|---|
| defvar | [W2] [CL 86] defines variable or constant |
| defconstant | [W2] [CL 86] defines variable or constant |
| let | [W2] local variable declaration |
| let* | [E1][W2] local variable declaration |
| set | [W2] [CL 122,121] variable assignement |
| setq | [W2] [CL 122,121] variable assignement |
| set | [W1] variable assignement |
| setq | [W1] variable assignement |
| : | [W1] variable assignement |
| with | [W1] local variable declaration |
| with-eval | [W1] local variable declaration |

6.1.17 Miscelaneous

| Function | Action |
|---|---|
| context-save | [W1] context management |
| context-restore | [W1] context management |
| gensym | [E1][E2] generate a symbol |
| random | [E1][W2] [CL 365] generate a random number |

APPENDIX 6 (CONT'D)

6.1.18 System

| Function | Action |
|---|---|
| ! | [E1] execute a shell command |
| ! | [W2] execute a shell command |
| system | [E1] execute a shell command |
| system | [W2] execute a shell command |
| !! | [W2] execute a shell command |
| getenv | [W1&2] get the value of a shell variable |
| get-internal-run-time | [W2][CL 705] get running time |
| time-elapsed | [E1] get running time |
| elapsed-time | [G1] get running time |
| popen | [E1] open a pipe stream with a forked shell |

6.1.19 Internal

| Function | Action |
|---|---|
| hack | [W2] raw access to WOOL internal structures |
| hack | [W1] raw access to WOOL internal structures |
| hashinfo | [W1&2] statistics on symbol storage |
| meminfo | [W1&2] print memory used |
| oblist | [W1] print all defined objects |
| stack-print-level | [W1&2]number of stack frames printed on error |
| trace-level | [W1&2] trace calls to a WOOL function |
| trace-all | [W1&2] trace calls to a WOOL function |
| trace | [W1&2] trace and untrace a function |
| untrace | [W1&2] trace and untrace a function |

APPENDIX 6 (CONT'D)

6.2 WOOL EGERIA PART

6.2.1 Any

| Function | Action |
|---|---|
| class-is-subclass | [E1] tests if a class is subclass of another |
| class-super-class | [E1] will be removed... returns superclass |
| eg:cast | [E1] ? change the type of an object |
| type-is-subtype | [W2] ? tests if a type is subtype of another |

6.2.2 Attribute

| Function | Action |
|---|---|
| eg:attribute-atom | [E1] ? returns information about a widget attribute |
| eg:attribute-make | [E1] ? defines a widget attribute |
| eg:attribute-name | [E1] ? returns information about a widget attribute |
| eg:attribute-type | [E1] ? returns information about a widget attribute |

6.2.3 Behavior

| Function | Action |
|---|---|
| XtAddCallback | [E1] ? adds or remove callback in a widget |
| XtAddEventHandler | [E1] ? add or remove an event handler |
| XtRemoveCallback | [E1] ? adds or remove callback in a widget |
| XtRemoveEventHandler | [E1] ? add or remove an event handler |
| call-back | [E1&2] call a callback function |
| eg:callback-make-from-string | [E1] ? create a callback from a string |
| eg:callback-make | [E1] ? create a callback from an expression |
| widget-add-callback | [E1] ? adds or remove callback in a widget |
| widget-add-event-handler | [E1] ? add or remove an event handler |
| widget-remove-callback | [E1] ? adds or remove callback in a widget |
| widget-remove-event-handler | [E1] ? add or remove an event handler |
| work-proc | [E1] will be removed... get or set workproc expression |

60

APPENDIX 6 (CONT'D)

6.2.4 Control

| Function | Action |
|---|---|
| apply | [E1] [W2] apply a function with given parameters |
| atom-for | [E1] iterates on each symbol |
| do-symbol | [W2] iterates on each symbol |
| error | [E1] will be removed... prompts an error message |
| range-for | [E1] will be removed ... iterates throught a range of integers |
| warning | [E1] ? generate a warning |

6.2.5 Development

| Function | Action |
|---|---|
| break | [W1&2] null function |
| measure-doing | [E1] ? to begin or stop measure |
| measure-print | [E1] ? print statistic information about user functions |

61

APPENDIX 6 (CONT'D)

6.2.6 Egeria

| Function | Action |
|---|---|
| ed:ask-parent | [E1] [?] interactively ask to designate a widget |
| ed:ghost-color | [E1] [?] active value : the color of the ghost rectangle |
| ed:handle-height | [E1] [?] active values : the width and height of the handles |
| ed:handle-width | [E1] [?] active values : the width and height of the handles |
| ed:select-widget | [E1] [?] get and set the list of selected widgets |
| ed:selected-list-get | [E1] [?] get and set the list of selected widgets |
| ed:selected-list-set | [E1] [?] get and set the list of selected widgets |
| eg:application-class | [E1] [?] the class of the current application |
| eg:application-name | [E1] [?] the name of the current application |
| eg:default-edition-mode | [E1] [?] the default egeria mode |
| eg:editable | [E1] [?] indicates if created widget will be editable |
| eg:edition-mode | [E1] [?] active value : the global egeria mode |
| eg:identifier-to-widget | [E1] [?] the widget given by an identifier |
| eg:load | [E1] [?] load a non editable file description of widgets |
| eg:profile-name | [E1] [?] the name of the first profile name |
| eg:script-update | [E1] [?] updates widget identifier in script |
| eg:widget-description | [E1] [?] give an expression describing the widget |
| eg:widget-for | [E1] [?] iterate through the list of edited widgets |
| eg:widget-is-editable | [E1] [?] say if a widget is editable |
| eg:widget-pprint | [E1] [?] pretty print a widget |
| eg:widget-to-apply | [E1] [?] yhe parent widget if it is a shell |
| eg:widget-to-identifier | [E1] [?] the identifier of a widget |
| eg:widget-top-list | [E1] [?] the list of shell or toplevel widgets |
| sw | [E1] [?] returns selected widget |

62

APPENDIX 6 (CONT'D)

6.2.7 Event

| Function | Action |
|---|---|
| eg:cursor-position | [E1] [?] get the cursor coordinates |
| eg:cursor-x | [E1] [?] get the cursor coordinates |
| eg:cursor-y | [E1] [?] get the cursor coordinates |
| eg:which-button | [E1] [?] the mouse button pressed in the last X event |

6.2.8 Misc

| Function | Action |
|---|---|
| eg:XmString-to-String | [E1] [?] convert an XmString to an ascii string |
| eg:cut-buffer | [E1] [?] get the cut buffer |
| eg:default | [E1] [?] |
| eg:define-cursor | [E1] [?]set and unset the cursor shape |
| eg:flush | [E1] [?] flush the X server |
| eg:resource-get | [E1] [?]get or set an X resource |
| eg:resource-put | [E1] [?] get or set an X resource |
| eg:synchronize-expose | [E1] [?] synchronize the X server |
| eg:undefine-cursor | [E1] [?]get and unset the cursor shape |
| eg:xt-convert | [E1] [?] convert an object from one type to another |

APPENDIX 6 (CONT'D)

6.2.9 Plist

| Function | Action |
|---|---|
| eg:properties-get | [E1] ? get or put properties of an object |
| eg:properties-put | [E1] ? get or put properties of an object |
| eg:property-get | [E1] ? get or put property of any object |
| eg:property-put | [E1] ? get or put property of any object |
| get | [E1] ? get or put property of any object |
| plist-for | [E1] ? iterates through a property list |
| plist-get | [E1] ? get or put a property in a plist |
| plist-list-get | [E1] ? get or put properties in a plist |
| plist-list-put! | [E1] ? get or put properties in a plist |
| plist-make | [E1] will be removed... make a property list from a simple list |
| plist-put! | [E1] ? get or put property in a plist |
| plist-put | [E1] ? get or put property in a plist |
| plist-remove | [E1] will be removed... remove properties from a list |
| properties-get | [E1] ? get or put properties of an object |
| properties-put | [E1] ? get or put properties of an object |
| property-get | [E1] ? get or put property of any object |
| property-put | [E1] ? get or put property of any object |
| put | [E1] ? get or put property of any object |

6.2.10 Stream

| Function | Action |
|---|---|
| buffer-make | [E1] creates a stream buffer |
| buffer-reset | [E1] ? resets the content of the buffer |
| buffer-string | [E1] gets the content of the buffer |

6.2.11 Symbol

| Function | Action |
|---|---|
| NONE | [E1&2] designates no value |
| atom-for | [E1] iterates on each symbol |
| do-symbol | [W2] iterates on each symbol |

APPENDIX 6 (CONT'D)

6.2.12 Widget

| Function | Action |
|---|---|
| XtCreatePopupShell | [E1&2] creates a widget |
| XtCreateWidget | [E1&2] creates a widget |
| XtDestroyWidget | [E1&2] destroy a widget and all its children |
| XtGetValues | [E1&2] get MOTIF resources of a widget |
| XtManageChild | [E1&2] manage or unmanage a child widget |
| XtMapWidget | [E1] [?] map or unmap a child widget |
| XtMoveWidget | [E1&2] move or resizes a widget |
| XtParent | [E1&2] get the parent widget of a widget |
| XtPopdown | [E1&2] pop-up or popdown a menu |
| XtPopup | [E1&2] pop-up or popdown a menu |
| XtRealizeWidget | [E1&2] creates X window associated with widget |
| XtResize | [E1&2] XtMakeGeometryRequest |
| moves or resizes a widget XtSetValues | [E1&2] Set MOTIF resources of a widget |
| XtTranslateCoords | [E1&2] translates to root window coordinates |
| XtUnmanageChild | [E1&2] manage or unmanage a child widget |
| XtUnmapWidget | [E1] [?] map or unmap a child widget |
| attribute-get | [E1&2] get and set the value of a widget attribute |
| attribute-set | [E1&2] get and set the value of a widget attribute |

APPENDIX 6 (CONT'D)

6.2.12 Widget (suite)

| Function | Action |
|---|---|
| eg:XmButtonPopdownChildren | [E1] [?] popdown children of a menu |
| eg:XmDisarm | [E1] [?] disarms a cascade button |
| eg:widget-children | [E1] [?] the list of children widgets |
| eg:widget-lower | [E1] [?] raise or lower a widget window |
| eg:widget-raise | [E1] [?] raise or lower a widget window |
| eg:widget-rank | [E1] [?] get or set rank of a widget in children list |
| eg:widget-redraw | [E1] [?] redraw a widget. |
| eg:widget-set-menu-position | [E1] [?] get the position of a menu |
| eg:widget-shell-children | [E1] [?] the list of children widgets |
| popup-shell-create | [E1&2] creates a widget |
| widget-create | [E1&2] creates a widget |
| widget-destroy | [E1&2] destroy a widget and all its children |
| widget-geometry-request | [E1&2] moves or resizes a widget |
| widget-get-values | [E1&2] get MOTIF resources of a widget |
| widget-manage | [E1&2] manage or unmanage a child widget |
| widget-map | [E1] [?] map or unmap a child widget |
| widget-move | [E1&2] moves or resizes a widget |

66

APPENDIX 6 (CONT'D)

6.2.13 WidgetClass

| Function | Action |
|---|---|
| XtGetConstraintResourceList | [E1] [?] get resource list of a widget class |
| XtGetResourceList | [E1] [?] get resource list of a widget class |
| eg:widget-class-atom | [E1] [?] returns information on a widget class |
| eg:widget-class-creator | [E1] [?] returns information on a widget class |
| eg:widget-class-father | [E1] [?] returns super-class of a class |
| eg:widget-class-is-subclass | [E1] [?] test if a class is a sub class of another |
| eg:widget-class-name | [E1] [?] returns information on a widget class |
| eg:widget-class-variable | [E1] [?] returns information on a widget class |
| widget-class-constraint-resource-list | [E1] [?] get resource list of a widget class |
| widget-class-resource-list | [E1] [?] get resource list of a widget class |

6.2.14 Xmlinear

| Function | Action |
|---|---|
| XmLinearDrawReference | [E1] [?] draw reference size and position of children |
| XmLinearRestoreReference | [E1] [?] restore size to reference size |
| XmLinearSaveReference | [E1] [?] save current coordinates as reference |

APPENDIX 6 (CONT'D)

6.2.15 Xmlist

| Function | Action |
| --- | --- |
| XmListAddItems | [E1&2] add an item or a list of items to a list |
| XmListAddItem | [E1&2] add an item or a list of items to a list |
| XmListDeleteAllItems | [E1&2] deselect all the items of list |
| XmListDeselectAllItems | [E1&2] deselect all the items of list |
| XmListDo | [E1] will be removed... perform a list operation on an item in List widget |
| XmListGetSelected | [E1] will be removed... get the list of selected items |
| XmListGet | [E1] will be removed... get or set the list of items |
| XmListItemExists | [E1&2] checks if and item is in a list widget |
| XmListSet | [E1] will be removed... get or set the list of items |

6.2.16 Xmtext

| Function | Action |
| --- | --- |
| XmTextGetString | [E1&2] get the text in a text widget |
| XmTextReplace | [E1&2] replace the text in a text widget |
| XmTextSetSelection | [E1&2] selects a string in a text widget |
| XmTextSetString | [E1&2] set the text in a text widget |

APPENDIX 6 (CONT'D)

6.3 C Part

6.3.1 Hight level

| Function | Action |
|---|---|
| EgCallbackDefine | [E1&2] define a Callback |
| EgMain | [E1&2] start EGERIA run-time |
| EgTypedCallbackDefine | [E1&2] define a Callback |
| EgVariableGetCValue | [E1&2] set or get a WOOL variable |
| EgVariableSetCValue | [E1&2] set or get a WOOL variable |

6.3.2 Object

| Function | Action |
|---|---|
| EgObjectCopy | [E1&2] copy an object |
| EgObjectCreateFromXtArgVal | [E1&2] Creates a new object from C value |
| EgObjectCreate | [E1&2] Creates a new object from C value |
| EgObjectDecreaseRef | [E1&2] decrease or increase the reference count of an object |
| EgObjectEqual | [E1&2] Test equality of two objects |
| EgObjectEval | [E1&2] Evaluates an object |
| EgObjectGetCValue | [E1&2] Gets C value of an object |
| EgObjectIncreaseRef | [E1&2] decrease or increase the reference count of an object |
| EgObjectInternEval | [E1&2] Evaluates an object |
| EgObjectIsSubclass | [E1&2] Checks the class of an object |
| EgObjectModify | [E1] [?] Sets C value of an object |
| EgObjectPrint | [E1&2] Prints the wool object |

APPENDIX 6 (CONT'D)

6.3.3 List

| Function | Action |
|---|---|
| EgListAppendItem | [E1&2] append an object to a list |
| EgListContainItem | [E1] will be removed... test if an item is in a list |
| EgListCreateFromArray | [E1&2] create a list from an array |
| EgListCreateN | [E1&2] create a list |
| EgListCreateOfSize | [E1] ? create a list of given size |
| EgListCreate | [E1&2] create a list |
| EgListGetArray | [E1&2] get contents of the list in C array |
| EgListGetItem | [E1&2] get or set an item in a list |
| EgListGetPosition | [E1] ? get the position of an object in a list |
| EgListInsertItem | [E1&2] insert an object in a list |
| EgListLength | [E1&2] the length of a list |
| EgListMoveItem | [E1&2] move an element inside a list |
| EgListRemoveItem | [E1&2] Removes one item |
| EgListSetItem | [E1&2] get or set an item in a list |
| EgListReset | [E1] ? Removes all items in a list |

6.3.4 Class

| Function | Action |
|---|---|
| EgClassCreate | [E1&2] Creates a new Egeria class |
| EgClassGetMethod | [E1&2].set or get a method of a class |
| EgClassIsSubclass | [E1&2] Tests subclassing |
| EgClassSetMethod | [E1&2] set or get a method of a class |
| EgToolkitClassCreate | [E1&2] Creates a new Egeria class |
| EgToolkitEnumerationClassCreate | [E1&2] Creates a new Egeria class |
| EgToolkitSynonymousClassCreate | [E1&2] Creates a new Egeria class |
| EgClassDestroy | [E1] ? Destroyes a class |

APPENDIX 6 (CONT'D)

6.3.5 Misc

| Function |
|---|
| EgActiveDefine |
| EgArgumentMustBe |
| EgConvenientWidgetClassCreate |
| EgError |
| EgFunctionDefine |
| EgMalloc |
| EgReallocEgCalloc[E1&2] Memory management functions EgNormalWidgetClassCreate |
| EgPointerDefine |
| EgPrintf |
| EgPuts |
| EgVariableGetObject |
| EgVariableSetObject |
| EgWarning |
| EgPutChar |

APPENDIX 7

EgActive Define - define an active value

```
void EgActiveDefine(name, getFunction,setFunction)
      char*name;
      EGFunction getFunction;
      EGFunction setFunction;
```

To define a WOOL active value, use the function EgActiveDefine. An active value may be viewed as a variable or as a function at the same time. The principle is that a specific function is called when you assign or when you consult an active value.

The get function has no parameters and returns an EgObject, the set function has one parameter (the value set) and returns an EgObject.

The corresponding WOOL verb can be used as a function or a variable like :
CAUTION : Both *set* and *get* functions must return an bf EgObject value.

```
(setq active1 34)
(active1 34)
```

which have the same effect, the active value being defined by :

```
int valueActive1;

EgObject
getFunctionActive1()
{
      return EgObjectCreate (EgClassInt, valueActive1);
}

EgObject
setFunctionActive1 (object)
      EgObject object;
{
      if (EgObjectIsSubclass(object,EgClassInt)) {
         valueActive1 = EgObjectGetCValue (object);
         return object;
      } else {
         return EgNIL;
      }
}

EgActiveDefine("active1", getFunctionActive1, setFunctionActive1);
```

APPENDIX 7 (CONT'D)

EgArgumentMust be - check the type of an argument

```
void EgArgumentMustBe (number, object, class)
      int number;
      EgObject object;
      EgClass class;
```

Check the class of an argument and call EgError ~~to~~ give to the WOOL programmer an appropriate message. *number* will give the position in the corresponding WOOL call of the wrong argument. The position starts at 0.

```
EgArgumentMustBe (0, argv[0], EgClassInt);
```

---

EgClassCreate
EgToolkitClassCreate
EgToolkitSynonymousClassCreate
EgToolkitEnumerationClassCreate - Creates a new Egeria class

```
EgClass EgClassCreate (superClass, name)
      EgClass superClass;
      char * name;
EgClass EgToolkitClassCreate (name, class, toolkit_type)
      EgClass class;
      char * name;
      caddr_t toolkit_type;
EgClass EgToolkitSynonymousClassCreate (name, class, toolkit_type)
      EgClass class;
      char * name;
      caddr_t toolkit_type;
EgClass EgToolkitEnumerationClassCreate (name, toolkit_type)
      char * name;
      caddr_t toolkit_type;
```

Creates a class by copying all characteristics of the class 'superClass'. That means that all methods are the same. The super class of the new class is the class 'superClass'. 'name' indicates the name of the new class in script' language.

```
EgClassUnsignedLong = EgClassCreate (
      EgClassInt, "UnsignedLong");
EgClassTranslationTable = EgToolkitClassCreate (
      EgClassStructured, "TranslationTable", XtRTranslationTable);
EgClassShellUnitType = EgToolkitSynonymousClassCreate(
      "ShellUnitType", EgClassUnitType, XtRShellUnitType);
EgClassOrientation = EgToolkitEnumerationClassCreate (
      "Orientation", XmROrientation);
```

EgToolkitSynonymousClassCreate does not really create a new class but makes it available in C and WOOL.

---

APPENDIX 7 (CONT'D)

EgClassDestroy - Destroyes a class void EgClassDestroy (*class*);
EgClass class;

You must be sure that you have already destroyed every subclasses and every objects of this class. Actually, this function only changes methods to produce error if one try to print, to eval, or to call any method with an object of the destroyed class.

---

EgClassGetMethod
EgClassSetMethod - set or get a method of a class

EgMethod EgClassGetMethod (*class, methodName*)
EgClass class;
EgMethodName method;
void EgClassSetMethod (*class, methodName, methodFunction*)
EgClass class;
EgMethodName methodName;
EgMethod methodFunction;

This allows to consult or modify the function called when a message *methodName* is send to an object of the class *class*. This is usually used to create new class by copying existing one and then modify some characteristics. Parameters of *methodFunction* depend on the method. Here is a table of available methods in WOOL release 1. Note that there is pseudo method which allows to access to data instead of functions : such as EgMethodTypeName which is the name of the class.

| Predefined methods | | |
|---|---|---|
| **EgMethodName** | **Parameters** | **returned value** |
| EgMethodEval | (object1) | object2 |
| EgMethodPrint | (object) | object |
| EgMethodFree | (object) | NULL |
| EgMethodCopy | (object1) | object2 |
| EgMethodEqual | (object1, object2) | object1 or t or nil |
| EgMethodMake | (c_value) | object |
| EgMethodExecute | (object) | |
| EgMethodSet | (object1, object2) | object2 |
| EgMethodSetq | (object1, object2) | evaluation of object2 |
| EgMethodGet_C_value | (object) | c_value |
| EgMethodSilent_eval | (object1) | object2 |
| EgMethodTypeName | not a real method | atom |
| EgMethodTable | not a real method | NULL or egTable |
| EgMethodToolkit_type | not a real method | XtR... |
| EgMethodHook | not longer used | |
| EgMethodToolkitConverter | not a real method | |
| EgMethodSuperClass | not a real method | EgClass |

CAUTION : *The available methods and their programming interface may be subject to modifications in the future.*

---

74
APPENDIX 7 (CONT'D)

EgClassIsSubclass - Tests subclassing int EgClassIsSubclass (*class1, class2*)
EgClass class1, class2;

Returns True if class1 is a subclass of class2, False otherwise.

---

EgConvenientWidgetClassCreate
EgNormalWidgetClassCreate - Record a new widget class void EgNormalWidgetClassCreate (*prefix, wool_name, toolkit_id*);
char *prefix;
char *wool_name;
WidgetClass toolkit_id;

void EgConvenientWidgetClassCreate (*prefix, wool_name, toolkit_id, creator*);
char *prefix;
char *wool_name;
WidgetClass toolkit_id;
EgWidgetCreator creator;

Example: to define XmMessageBox and XmMessageDialog.

```
EgConvenientWidgetClassCreate("Xm" "MessageBox",
      xmMessageBoxWidgetClass, XmCreateMessageBox);
EgConvenientWidgetClassCreate("Xm", "MessageDialog",
      xmMessageBoxWidgetClass, XmCreateMessageDialog);
```

CAUTION: Convenient class must be recorded after their real class. Example: MessageDialog after MessageBox.

---

EgError - print a warning error and stop execution

```
void EgError (stringFormat, value)
     char *stringFormat;
     long value;
```

Prints an error message and stops execution. Jumps to the toplevel of the running WOOL program. See also : EgWarning.

```
if (argc != 3) EgError ("bad number of arguments %d", argc);
...
if (argc != 3) EgError (egError_BAD_NUMBER_OF_ARGS, argc);
```

| Predefined string formats | |
|---|---|
| **C identifier** | **Expected parameter type** |
| egError_UNDEFINED_VARIABLE | char * name |
| egError_BAD_NUMBER_OF_ARGS | int argc |
| egError_UNDEFINED_FUNCTION | EgObject function |
| egError_BAD_DEFUN | char * name |
| egError_BAD_ARG_TYPE | int position |
| egError_RELEASING_ATOM | char * name |
| egError_BAD_LOCAL_SYNTAX | char * message |
| egError_NOT_AN_ATOM | char * name |
| egError_SYNTAX_ERROR | char * message |
| egError_INTERNAL_ERROR | char * message |
| egError_TIME_EXCEEDED | int seconds |
| egError_CANNOT_SET | EgClass class |
| egError_CANNOT_GET_C_VALUE | EgClass class |
| egError_TOO_MANY_PARAMETERS | EgObject function |
| egError_NON_WOOL_OBJECT | char * message |
| egError_UNDEFINED_METHOD | EgClass class |
| egError_NO_MEMORY | NULL |
| egError_NOT_REDEFINABLE | EgObject object |
| egError_NOT_MODIFIABLE | EgObject object |
| egError_SILENT_ERROR | NULL INTERN |
| egError_USER_ERROR | NULL INTERN |

---

EgFunctionDefine - define a WOOL function

```
void EgFunctionDefine (name, function, arity)
     char *name;
     char EgFunction function;
     int arity;
```

EgFunctionDefine allows to create a new function.

*name* is the name of the function as it will be called from WOOL.

*function* is the function.
*arity* indicates the number of arguments expected. It may vary from 0 up to 5 or may be be NARY.

CAUTION : An Egeria function must always return an EgObject.

```
EgObject substraction (object0, object1)
   EgObject object0, object1;
{
   int result;
   EgArgumentMustBe(0, object0, EgClassInt);
   EgArgumentMustBe(1, object1, EgClassInt);
   result = ((int) EgObjectGetCValue(object0)) - ((int) EgObjectGetCValue(object1));
   return EgObjectCreate(EgClassInt, result);
}
EgObject addition (argc, argv)
   int argc;
   EgObject *argv;
{
   int result, i;
   if (argc < 1) EgError (egError_BAD_NUMBER_OF_ARGS, argc);
   for (i = 0; i < argc; i++) {
       EgArgumentMustBe(i, argv[i], EgClassInt);
       result + = EgObjectGetCValue(argv[i]);
   return EgObjectCreate(EgClassInt, result);
}

void
InitCallback (widget, closure, callData)
   Widget widget;
   caddr_t closure;
   caddr_t callData;
{
   ...
   EgFunctionDefine ("sub", substraction, 2);
   EgFunctionDefine ("add", addition, NARY);
   ...
}
```

NOTE : It is important to note that the recorded function accepts only WOOL arguments. So it is often necessary to write an intermediate function with WOOL arguments which check the type of argument, get the C value and call any C function. A way to record a function describing its programming interface could be studied.

---

EgListAppendItem - append an object to a list void EgListAppendItem (*list, item*)
   EgList list;
   EgObject item;

Append an object to the end of a list. See also: EgListInsertItem.

---

APPENDIX 7 (CONT'D)

EgListContainItem - test if an item is in a list int EgListContainItem (*list, item*)
EgList list;
EgObject item;

CAUTION: *Use* EgListGetPosition *instead.*

---

EgListCreate
EgListCreateN - create a list

EgList EgListCreate ()
EgList EgListCreate0 ()
EgList EgListCreate1 (*object*)
EgObject object;

EgList EgListCreate2 (*object1, object2*)
EgObject object1, object2;

EgList EgListCreate3 (*object1, object2, object3*)
EgObject object1, object2, object3;

EgList EgListCreate4 (*object1, object2, object3, object4*)
EgObject object1, object2, object3, object4;

EgList EgListCreate5 (*object1, object2, object3, object4, object5*)
EgObject object1, object2, object3, object4, object5;

EgListCreate and EgListCreate0 are identical. EgListCreate1, ..., EgListCreate5 are provided for convenience. These functions use EgObject-IncreaseRef. See also EgList-CreateFromArray.

---

EgListCreateFromArray - create a list from an array

EgList EgListCreateFromArray (*argc, argv*)
int argc;
EgObject *argv;

To create a WOOL list object from an array, use EgListCreateFromArray. *argc* gives the number of elements in the array *argv*

---

78

APPENDIX 7 (CONT'D)

EgListCreateOfSize - create a list of given size

EgList EgListCreateOfSize (*size, item*)
  int size;
  EgObject item;

EgListCreateOSize creates a list of a given size. The following example creates the list (nil nil nil).

```
EgListCreateOfSize(3, EgNIL);
```

---

EgListGetArray - get contents of the list in C array

EgObject * EgListGetArray (*list*)
  EgList list;

CAUTION: the array must not be free. It must not be ~~modified directly~~ directly modified to avoid error with *reference_count* of items or length of the list.

See also: EgObjectDecreaseRef, EgObjectIncreaseRef

---

EgListGetItem
EgListSetItem - get or set an item in a list

EgObject EgListGetItem (*list, position*)
  EgList list;
  int position;
int EgListSetItem (*list, position, object*)
  EgList list;
  int position;
  int object;

Gets or sets an object from a list at a given position. EgListGetItem returns EgNIL if position is not correct. EgListSetItem returns True if done and False otherwise.

Note: position starts from 0.

---

EgListGetPosition - get the position of an object in a list int EgListGetPosition (*list, item*)
  EgList list;
  EgObject item;

Returns the position of the item in the list. 0 is the first position in the list. Returns -1 if the item is not found in the list.

---

APPENDIX 7 (CONT'D)

EgListInsertItem - insert an object in a list

```
void EgListInsertItem (list, position, item)
      EgList list;
      int position;
      EgObject item;
```

Insert an object in a list at a given position, except if position is less than 0 (insertion is done at the begining of the list) or if position is more than the length of list (insertion is done at the end of the list).

The first position in the list is given by 0. See also: EgListAppendItem.

---

EgListLength - the length of a list

```
EgObject EgListLength (list)
      EgList list;
```

Returns the length of a list.

---

EgListMoveItem - move an element inside a a list

```
int EgListMoveItem (list, oldPosition, newposition)
      EgList list;
      int oldposition;
      int newposition;
```

Changes the position of an item inside a list. Returns True if modification is done or False if oldposition or newposition is outside limits. In this last case, nothing is done.

NOTE: The first position in a list is 0 (zero). MODIFICATION: (in release 0.54): *moved item is described by its position* .

---

EgListRemoveItem - Removes one item

```
int EgListRemoveItem (list, position)
      EgList list;
      int position;
```

Returns True if it is done, False if position is out of range.

---

EgListReset - Removes all items in a list

```
void EgListReset (list)
      EgList list;
```

---

APPENDIX 7 (CONT'D)

| EgMalloc<br>EgFree<br>EgRealloc<br>EgCalloc | - Memory management functions |
|---|---|

```
caddr_t EgMalloc (bytes)
      int bytes;
void EgFree (ptr)
      caddr_t ptr;
caddr_t EgRealloc (ptr, bytes)
      caddr_t ptr;
      int bytes;
caddr_t EgCalloc (nelem, elsize)
      int nelem, bytes;
```

These are the same functions as corresponding UNIX ones. See also: MALLOC(3).

---

EgObjectCopy - copy an object

EgObject EgObjectCopy (*object*)

EgObject object;

Copy an object. This ~~allow to~~ allows the user to prevent border effect on the copied object. The result is equal but not necessarily eq. For a list, only the top level is copied.

---

EgObjectCreate - Creates a new object from C value

EgObjectCreateFromXtArgVal - Creates a new object from C value

```
EgObject EgObjectCreate (class, anyCValue)
      EgClass class;
      EgCValue anyCValue;
EgObject EgObjectCreateFromXtArgVal (class, anyCValue)
      EgClass class;
      EgCValue anyCValue;
```

This is a generic function used to create an object of any type except List. The second function EgObjectCreateFromXtArgVal is intended only for EXPERT who uses the result of toolkit functions which return XtArgVal values such as XtGetValues or XtConvert.

See also: EgVariableSetCValue, EgListCreate.

CAUTION: EgObjectCreateFromXtArgVal *should be changed to accept a pointer rather than a direct value. Otherwise it causes some problems on machines where casting from pointer to character toward pointer to integer is not always valid. At present, the compilation option* -DMISALIGN *allows the user to avoid the problem but an assignation is replaced by a* bcopy *and it is not very efficient.*

---

81

APPENDIX 7 (CONT'D)

EgObjectDecreaseRef
EgObjectIncreaseRef - decrease or increase the reference count of an object void EgObjectDecreaseRef (*object*)
    EgObject object;
void EgObjectIncreaseRef (*object*)
    EgObject object;

WOOL use a reference count garbage collection algorithm. When an object is referenced from ~~an other~~ another one, its reference count must be incremented. And when an object is no longer referenced, its reference count must be decremented. WOOL destroys objects with a reference count equal to 0.

---

EgObjectEqual - Test equality of two objects

EgObject EgObjectEqual (*object1, object2*)
    EgObject object1, object2;

Returns EgNIL if False and object1 if True (except if object1 is nil, in this case returns EgTRUE).

This function has the same semantic as the WOOL function equal.

---

EgObjectEval - Evaluates an object

EgObjectInternEval - Evaluates an object

EgObject EgObjectEval(*object*)
    EgObject object;
EgObject EgObjectInternEval(*object*)
    EgObject object;

Evaluation of many objects returns the object itself. Evaluation of list calls the function found as first item with following items as parameters.

The function EgObjectEval returns EgERROR if an error occurs.

The function EgObjectInternEval doesn't care ~~of~~ about errors. ~~So~~ Therefore, it must not be used except if you are quite sure that the code using it is executed from a WOOL function.

This is the basic function to call the WOOL interpreter.

---

EgObjectGetCValue - Gets C value of an object

EgCValue EgObjectGetCValue (*object*)
    EgObject object;

See also: EgVariableGetCValue, EgObjectCreate, EgObjectModify

MODIFICATION (in release 0.54 ): The old name of this function was EgObject-GetCValue.

---

EgObjectIsSubclass - Checks the class of an object int EgObjectIsSubclass (*object, class*)
    EgObject object;
    EgClass class;

EgObjectIsSubclass returns True or False.

EgObjectGetClass will probably not be available in next version.

---

EgObjectModify - Sets C value of an object void EgObjectModify (*object, anyCValue*)
    EgObject object;
    EgCValue anyCValue;

This function is very dangerous to use because of the border effect. It is the reason why its name is not EgObjectSetCValue. ~~This can be~~ It may be necessary to set to NULL the value which is a pointer when the pointer is no longer valid. But this can lead to ~~some problems about~~ type checking problems...

---

EgObjectPrint - Prints the wool object

EgObject EgObjectPrint (*object*)
    EgObject object;

See also EgPrintf, EgPuts, EgPutChar.

---

EgPointerDefine - define a shared variable

To Define a variable shared by the interpreter and the application, use EgPointerDefine. The shared value is always an integer.

void EgPointerDefine (*name, pointer*)
    char *name;
    EGCValue pointer;

83

APPENDIX 7 (CONT'D)

The difference with EgVariableSetCValue is that the argument is not a WOOL value but an address to a C value. This allows the interpreter and the application to set the value of the same memory address. From the WOOL side, an object of type Integer is created to hold this value.

From the application side :

```
long int fooBar;
EgPointerDefine("foo-bar", (EgCValue *) &fooBar);
fooBar = 78;
```

And from the WOOL side :

```
(print foo-bar)  ==>  78
```

---

| EgPrintf<br>EgPuts<br>EgPutChar | - print on current output stream |
|---|---|

void EgPrintf(char *string, void *arg) void EgPuts(char*string)
void EgPutChar(char c)

```
EgPrintf("there is %d widgets created", number);
EgPuts("hello");
EgPutc('\n');
```

---

| EgVariableGetObject<br>EgVariableSetObject | - get or set wool value of a variable |
|---|---|

void EgVariableSetObject (*name, object*)
    char * name;
    EgObject object;
EgObject EgVariableGetObject (*name*)
    char * name;

Assign an object to a WOOL variable.

These functions are different from EgVariableSetCValue and EgVariableSetCValue which manipulate C values and implicitly create a WOOL object.

MODIFICATION: (in release 0.54 ): *The old names were* EgVariableAssignObject and EgVariableConsultObject.

---

| EgWarning | - print a warning error |
|---|---|

void EgWarning (*stringFormat, value*)
    char *stringFormat;
    long value;

Prints a warning message and continues the execution. See also: EgError.

```
if (x <= 0) {
    EgWarning ("x (%d) is not positive", x);
    ...
```

What is claimed is:

1. An interactive interface description tool comprising:

a library of interactive objects;

a library of command objects;

a library of graphical objects;

an interface description program enabling the generation of an interface;

an interpreted language; and an object oriented interpreter for said interpreted language embedded within said interface description program wherein said interface description program works with said library of interactive objects, said library of command objects and said library of graphical objects and wherein dynamic behavior of the interactive objects is defined by a set of call back procedures written in said interpreted language that designate application functions called by said library of command objects upon receipt of an entry flag by one of the interactive objects of said library of interactive objects, wherein said interactive interface description tool further comprises a program that allows a user to display a base menu for invoking an edit function, a create function and a geometry function, wherein the edit function allows the user to edit interactive object attributes in a separate window, as well as edit attributes of respective interactive parent objects, and wherein the edit function allows the user to display an editing window for interactive object attributes, said window divided into two areas, a first of said areas including called functions of a callback application procedure, and a second of said areas including attributes displayed by a set of sub-editors associated with said edit function.

2. The interactive tool described in claim 1, wherein said interface description program consists of a mixture of C language instructions and interpreted language instructions.

3. The interactive tool described in claim 1, wherein the interpreter contains an incremental garbage collector using reference counters, wherein the garbage collector periodically and in a cyclic manner scans memory for unused objects whose space can be reused, and uses a mechanism that sorts objects by size in order to limit memory fragmentation.

4. The interactive tool described in claim 1, wherein interactive tool functions are described as an interpreted program.

5. The interactive tool described in claim 1, wherein appearance characteristics of said interactive objects, said command objects and said graphical objects of said interface are provided in a file which is independently editable and which is interpretable by said interpreter.

6. The interactive tool described in claim 1, wherein each of said interactive objects identified by a respective object in said interpreted language has supplementary attributes directly attached to said respective interpreted language object.

7. The interactive tool described in claim 1, wherein each object in the interpreted language is an autotyped structure written in the C language that contains object type and reference counter information.

8. The interactive tool described in claim 1, wherein a unique identifier is assigned to each of said interactive objects in the interpreted language in an incremental manner.

9. The interactive tool described in claim 1, wherein the create function allows the user to create an interactive object using a create menu to install said interactive object of the type chosen in a selected interactive object container.

10. The interactive tool described in claim 1, wherein said geometry function allows the user to control geometry of a set of selected interactive objects that can be aligned to a top edge, to a bottom edge, to a right side, to a left side or to have an identical width and height.

11. The interactive tool described in claim 1, wherein a first sub-editor of said set of sub-editors has a toggle switch used to enter boolean attributes.

12. The interactive tool described in claim 1, wherein a second sub-editor of said set of sub-editors has a push button that displays a menu, said menu displaying lists of enumeration values.

13. The interactive tool described in claim 1, wherein a third sub-editor of said set of sub-editors includes a text area for text and numerical value entry.

14. The interactive tool described in claim 1, wherein said edit function for interactive objects and for interactive parent objects is activated by selection of a "select parent" menu and an "edit attribute" function.

15. The interactive tool described in claim 9, wherein a mouse click in an interactive object container of a certain type results in installation of an object of the type chosen in the interactive object container.

16. The interactive tool described in claim 1, wherein the edit function enables cutting, pasting, copying, and duplicating of a selected interactive object.

17. The interactive tool described in claim 12, wherein said enumeration values comprise text alignment information.

18. The interactive tool described in claim 9, wherein the create function allows the user to choose between objects available in the library of command objects, which include selecting from the group consisting of: buttons, a container type object, an elaborated object, a simple object, a message type object, a dialogue type object, a menu type object and a container type object.

19. The interactive tool described in claim 18, wherein the selection of the container type object opens a second menu in which the user can select attributes from the group consisting of: maximum level, shell, override shell, transient shell, top level shell and application shell.

* * * * *